United States Patent [19]

Peterson et al.

[11] Patent Number: 5,537,741
[45] Date of Patent: Jul. 23, 1996

[54] METHOD OF WIRE HARNESS ASSEMBLY SYSTEM

[75] Inventors: Eric C. Peterson, Leon Valley; Alex H. Damalas, San Antonio; Glynn R. Bartlett, San Antonio; Steven B. Farmer, San Antonio; Leslie B. Hoffman, Boerne, all of Tex.; Tak Kameoka, Sakura, Japan; Horace H. Wacaser, Stuttgart, Germany; Paul B. Wood, San Antonio, Tex.

[73] Assignee: Alcoa Fujikura Limited, Brentwood, Tenn.

[21] Appl. No.: 382,541

[22] Filed: Feb. 1, 1995

[51] Int. Cl.⁶ .................................................. H01R 43/00
[52] U.S. Cl. ............................. 29/868; 29/748; 29/33 F
[58] Field of Search ........................... 29/833, 857, 748, 29/868, 564.4, 338, 33 M, 3 F

[56] References Cited

U.S. PATENT DOCUMENTS

| | | |
|---|---|---|
| 4,598,469 | 7/1986 | Weixel . |
| 4,607,430 | 8/1986 | Young . |
| 4,653,159 | 3/1987 | Henderson et al. . |
| 4,784,564 | 11/1988 | Selesky . |
| 4,787,138 | 11/1988 | Eaton et al. . |
| 5,119,546 | 6/1992 | Cameron et al. . |
| 5,127,159 | 7/1992 | Kudo et al. . |
| 5,224,251 | 7/1993 | Cameron et al. . |

*Primary Examiner*—Carl J. Arbes
*Attorney, Agent, or Firm*—Elroy Strickland

[57] ABSTRACT

A method and apparatus for making wire harness. The apparatus includes the use of a sequential wire processor that serially and sequentially fabricates circuits having terminal ends. The terminated circuits are transferred by a transfer means to an upstanding carousel provided with arrays of circuit-receiving clips. The transfer means receives terminated circuits from the sequential wire processor and places them on the clips of the carousel. The carousel is then moved to an assembly line and robotic station where robots remove the circuits from the clips of the carousel and place the terminated ends of the circuits in cavities of connectors strategically located on the assembly line. The robots have end effectors that physically insert the terminal ends into the connector cavities.

14 Claims, 18 Drawing Sheets

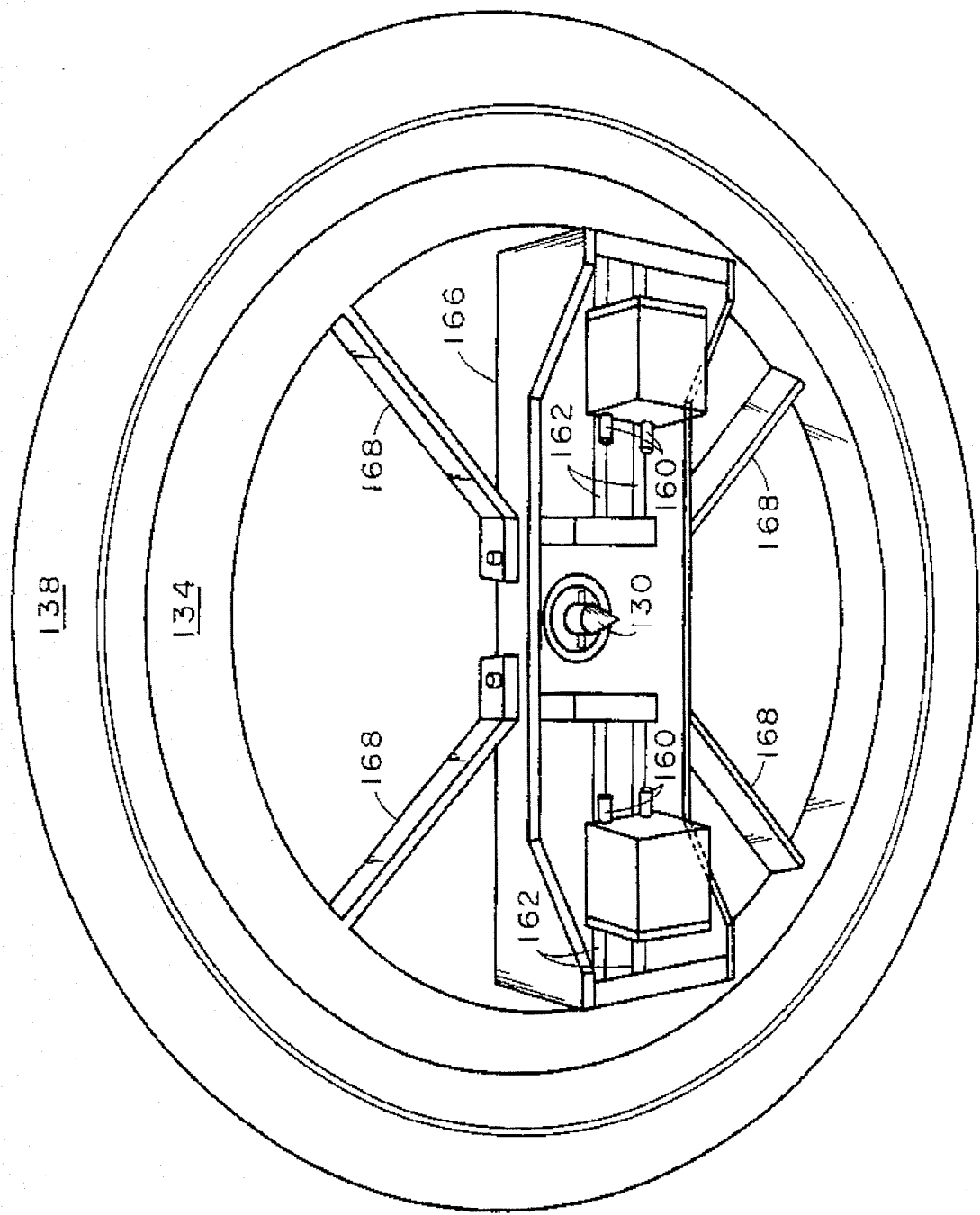

METHOD OF WIRE HARNESS ASSEMBLY SYSTEM

BACKGROUND OF THE INVENTION

The present invention relates generally to the making of wire harness, and more particularly to a combination of automated and manual techniques that provide circuit and process versatility and otherwise effective control of the manufacturing process.

The assembly of wire harnesses, particularly those of complex design such as found in automobiles, is typically labor intensive in an environment where quality requirements have become increasingly stringent. As a result, harness manufacturers look to automated assembly techniques as a way to reduce the incidence of random manufacturing defects.

Generally, wire harness manufacturers have been relatively slow to embrace automated processing as an answer to the difficult task of complying with rigorous quality standards. Most of this reluctance can be traced directly to the high number of process variables (e.g., wire gauge, wire length, wire color, wire marking, terminal type, connector type, etc. ), and the flexible, locationally unpredictable nature of wire itself, i.e., a wire can bend and/or twist such that its length dimension changes. The resultant variety of assembly process characteristics, coupled with shifting volume demand and design features for automotive harness, make automated wire harness assembly a formidable challenge.

Automated wiring harness assembly of automotive harness, such as ignition harness, has been undertaken, but success has not always been attainable. The flexibility necessary to adapt to the multitude of process, design and demand variables has not readily been realized. In addition, there is a need for automated apparatus to be integrated and harmonized with peripheral manual assembly operations.

SUMMARY OF THE INVENTION

The present invention involves a partially automated process for supplying terminated circuit or lead wires at a location separate and independent from a harness assembly operation. Such an arrangement provides an inherent flexibility to address a variety of harness designs. The assembly line of the system, using robotics, is both modular and distributive in nature such that it can be expanded to meet the needs of an increased demand in volume. As discussed in detail hereinafter, the assembly line integrates both automated and manual assembly tasks in a cohesive, continuous process.

As hereinafter used, the term "circuit" or "lead" refers to a single finite length of wire having one or both ends terminated with a terminal, the termination process being a crimping process. Hence, with such completion of a wire with terminal ends, the wire is "a circuit" and is addressed hereinafter as a "circuit".

The circuit or lead making process employs a commercially available sequential wire processor, such as a Komax 50, made in Dierikon, Switzerland. Such a wire processor fabricates single lead wires for a wire harness and provides the same with crimped terminals. The lead wires are fabricated and terminated in serial fashion by the sequential processor to become the above individual "circuits" and are synchronously and automatically placed on a multi-sided storage array carousel by a transfer device located at an insertion station of the processor. Before the circuits are placed on the carousel, however, the sequential processor flags defective crimped terminals. Real time monitoring of key terminal crimping quality can be accomplished, for example, by measuring crimping applicator force. A go/no go indication is generated such that when a defective circuit is received by the transfer device, the transfer device dumps the defective item so that it is not placed on the carousel.

Each empty carousel is manually moved to the location of the transfer device, and is operable to receive circuits sequentially from the transfer device. The circuits are placed in an array of segment-receiving clips provided on the faces of the carousel. Each terminal of each wire is mechanically oriented by the processor before it is given to the transfer device, and the transfer device correctly presents the oriented terminal to the carousel.

When the carousel is "full", it is manually transported to an inspection/insertion station. Here, the carousel is visually inspected for the presence of a full complement of circuits, and any specialty wire segments, such as multiple circuits or leads, twisted together, required to complete a wiring harness, are manually inserted into the clips of the carousel, again with proper terminal orientation.

The carousel is next manually moved from the inspection station and to a buffer area where it resides until needed by a robot station and assembly line, or if the robot line is empty, it can be directly moved to the robot line. At the robot line, robotic devices remove the circuits from the clips of the carousel (as many as three at a time) and transfer them to electrical connectors or connector blocks. The connectors are located on a formboard disposed adjacent the robotic devices. End effectors of the robotic devices insert the terminated ends of the circuits into connector cavities, and then perform insertion verification steps.

Connector "cavities" are openings in the connector blocks or bodies sized and configured to receive and retain terminated ends of the circuits.

Formboards are perforated planar boards of substantial area on which the connector blocks are strategically mounted and secured for the circuit terminal insertion and verification process.

When all harness circuits are inserted in their respective connector cavities, the formboard is moved to a manual test/rework station and a new formboard with empty connector cavities is moved into position at the robotic station.

Any failure associated with the circuit insertion process is automatically recorded and displayed on a terminal monitor such that appropriate steps can be taken to manually insert any circuit that has missed being inserted or is inserted but not properly retained in the receptacle. The display monitor indicates to operating personnel which circuit is at fault so that an attendant can quickly manually correct the fault and check its connection at the rework location.

The formboards are continually recycled via upper and lower automatic horizontal conveyors through the robot assembly station and the manual test, rework location, which is located adjacent the robotic assembly station.

The last manual operation performed prior to each formboard returning to the robotic station is the removal of the completed harness assembly, which includes the connectors, and the placing of new connectors on the formboard.

The sequential wire processor, via its controller, is operated by a conventional personal computer (PC). A second PC can be connected to the wire processor controller by digital "handshake" lines that allow the two entities to talk to each other in operating the sequential processor, transfer device and carousel. The two entities are run by coordinating software which is actually a handshaking binary code. Hence, the software provides a program whereby the output of the sequential processor is coordinated with mechanical jaws of the transfer device and circuit receiving and retaining clips of the carousel such that the circuits fabricated and terminated by the processor are sequentially and rapidly transferred to the carousel by the transfer device.

The protocol for the computers is provided by the manufacturer of the processor, and provides for "customer block loading". Such block loading refers to connectors, which are sometimes called "blocks", that are "plugged" by other circuit insertion units or manually.

Similarly, the robotic assembly station is run under the control of programmable controllers that coordinate indexing of the carousel with robot arms and end effectors. Circuits are picked from the carousel by the end effectors and transferred to connector blocks removably fixed on formboards where circuit ends are inserted into connector cavities by the robotic end effectors.

THE DRAWINGS

The objectives and advantages of the invention will be better understood from consideration of the following detailed description and the accompanying drawings in which:

FIG. 9 is a perspective view of apparatus for rotational indexing of the carousel, as seen from a location beneath the apparatus;

PREFERRED EMBODIMENT

Figure 1:
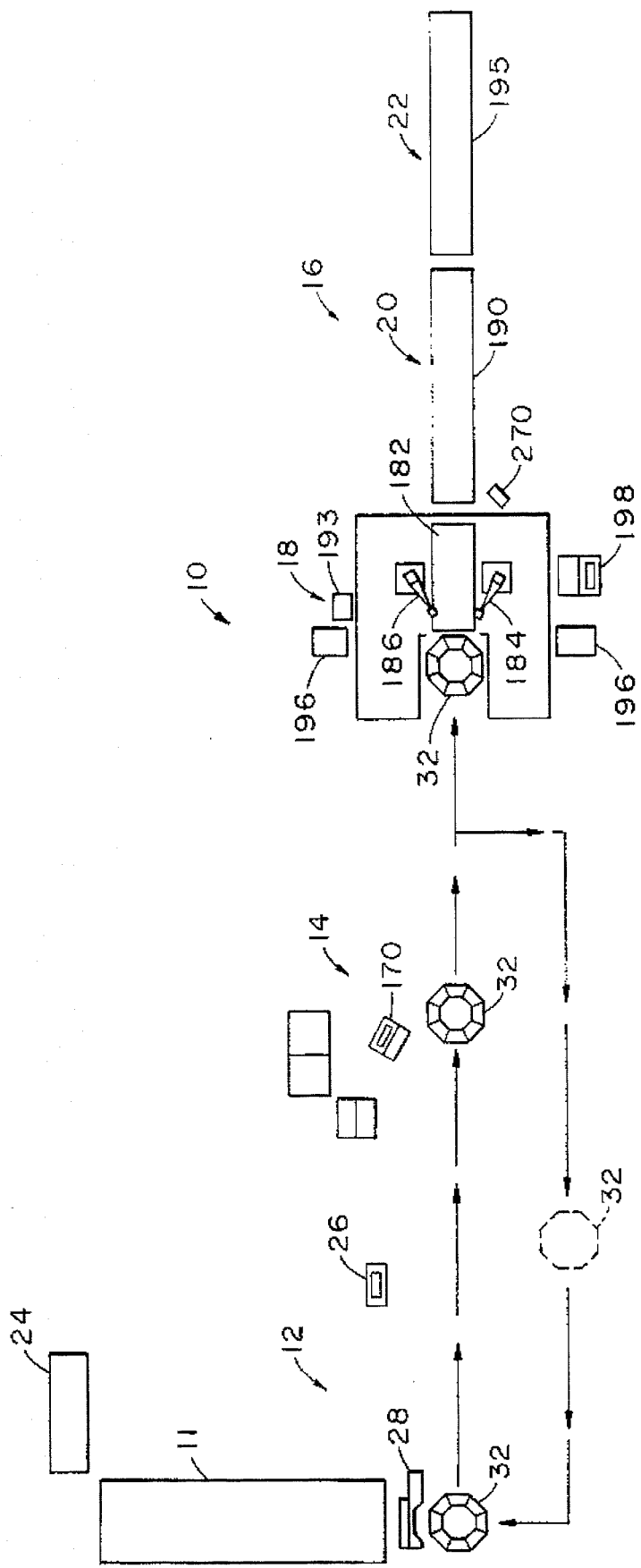
FIG. 1 is a diagrammatic plan view of the apparatus arrangement of the invention, which view shows a circuit making station, circuit transfer means, transportable carousels, a carousel inspection station, and a robotic assembly station, where circuits are inserted into connector cavities.

Referring now to FIG. 1 of the drawings, an arrangement 10 is shown in plan view in which different apparatus items of the invention are located to produce in an efficient manner and on a production basis completed wire harnesses from individual reels of wire and terminal strips (not shown) supplied to a sequential wire processor 11.

Figure 20:
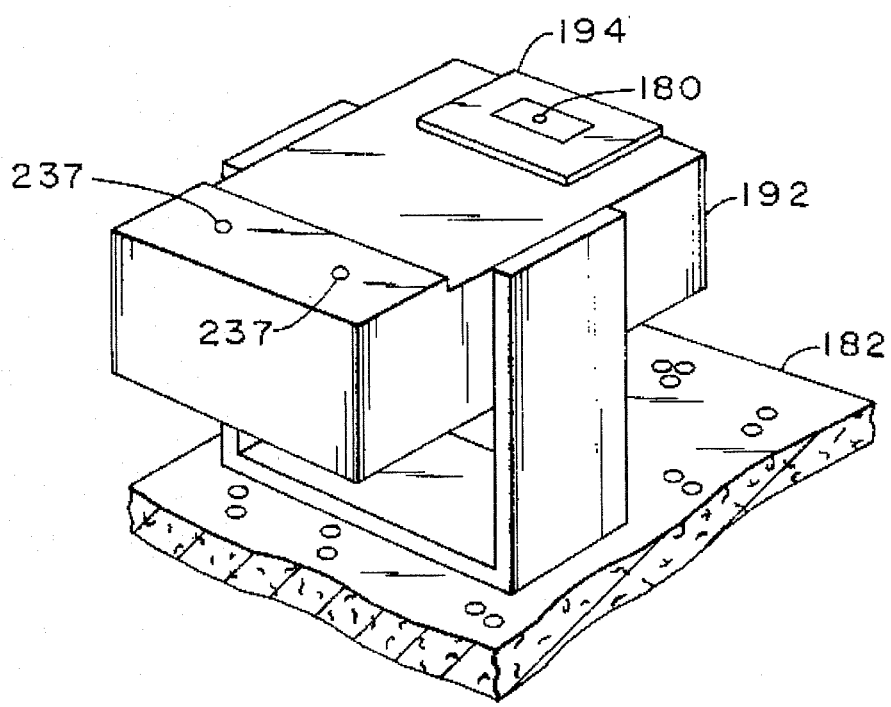
FIG. 20 is a perspective view of an assembly or fixture for mounting a connector block on a formboard.

More particularly, the totality of the apparatus depicted in FIG. 1 is located at three basic stations 12, 14 and 16 which are, respectively, Insertion Station, Inspection/Insertion Station and Assembly Line. Assembly Line 16 is, in turn, comprised of a robotic station 18, a rework station 20 (that includes a conveyor 190) and a final conveyor line and work station 22. Station 22 receives finished harnesses from the rework station and transfers the same to the end of 22 where harnesses are removed and empty connector blocks 180 (FIGS. 11, 12 and 20) are placed on a formboard 182 (FIGS.

11 and 12). The formboard, with the empty connector blocks, is sent to robotic station 18 by conveying means described hereinafter.

Figure 2:
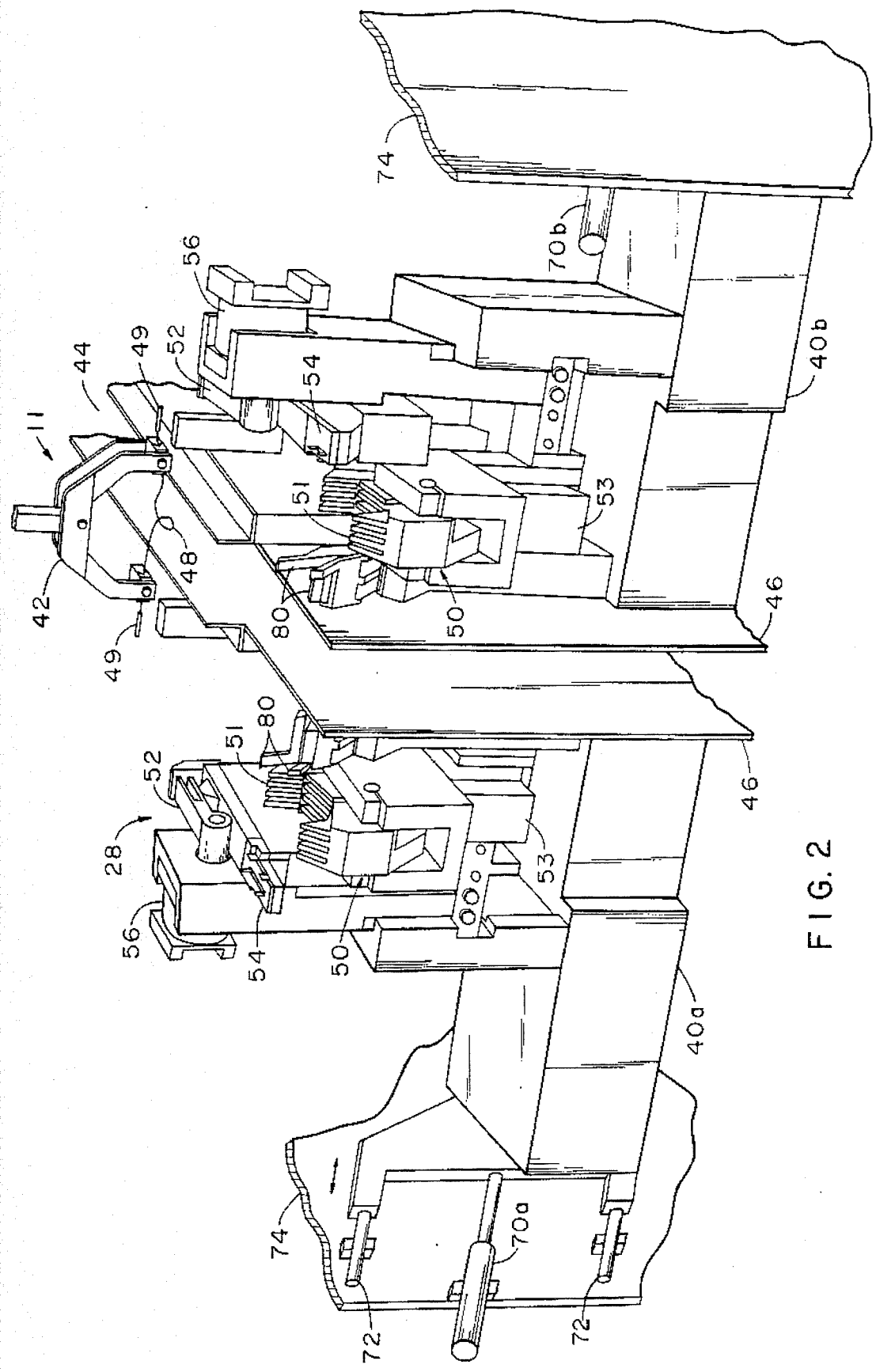
FIG. 2 is a perspective view of a circuit transfer device constructed in accordance with principles of the present invention.
Figure 2A:
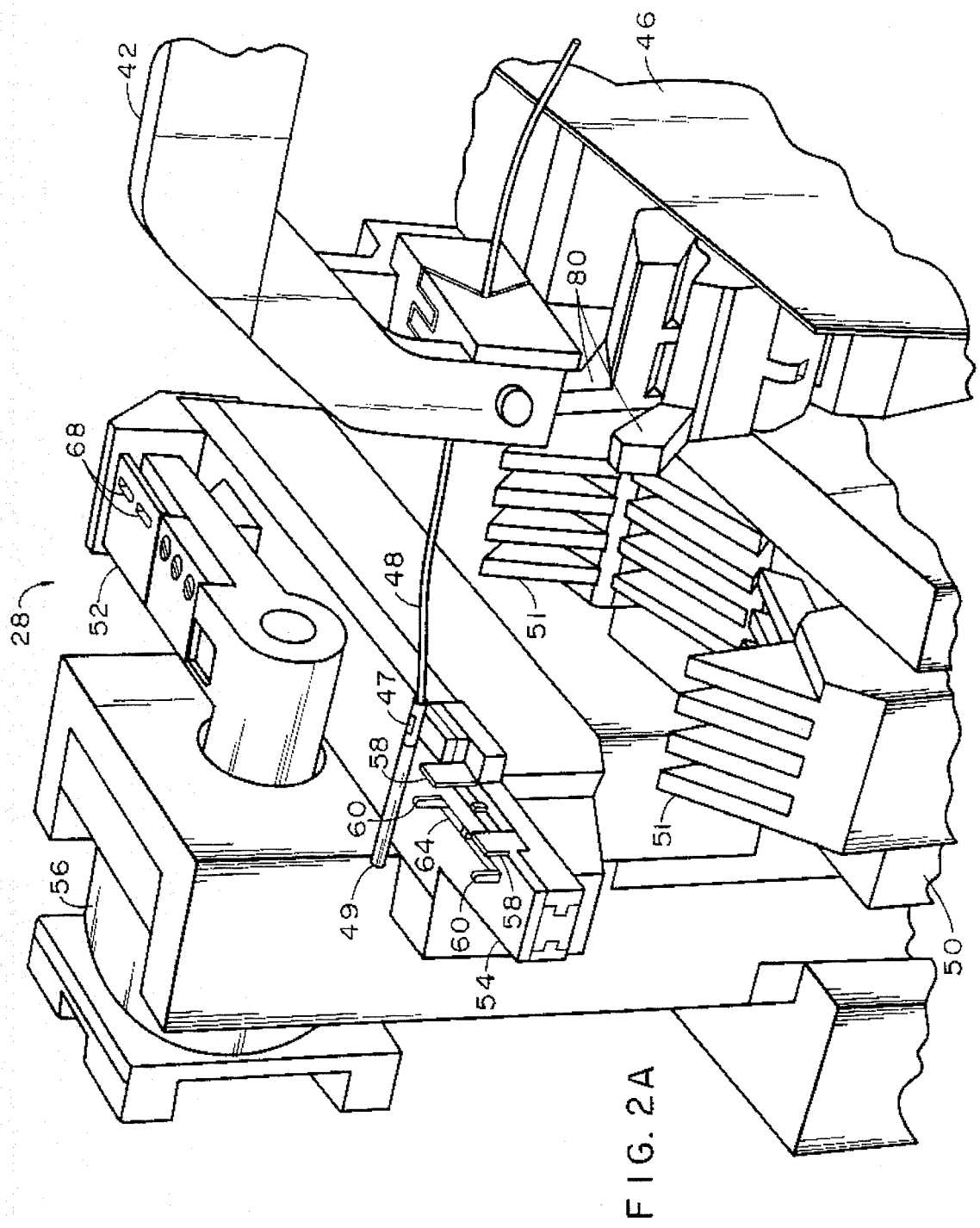
FIG. 2A is an enlarged portion of FIG. 2 showing one circuit which has been positioned on an anvil surface of the transfer device by a sequential wire processor at the circuit making station.

As discussed above, a Komax 50 machine can be employed as the sequential wire processor 11 at Insertion Station 12, such a processor being effective to serially cut wire leads from spools of color coded wire to preselected lengths for a harness, terminating the ends of the cut leads with terminal crimped at 47 (FIG. 2A) on said ends and verifying the crimp integrity of the terminals. Such terminated leads are referred to as "circuits", as discussed earlier. (One such circuit 48 with terminals 49 is shown in FIG. 2. A terminal crimp 47 is shown in FIG. 2A) The Komax 50 is powered and its basic operations are controlled by a power/controller 24 (FIG. 1) that is supplied with the Komax. The power/controller, in turn, is electrically connected to a personal computer (PC) 26 through digital "handshake" lines and handshake software that allows the PC to "talk" to the controller, and thus to the wire processor to control the processes of fabricating circuits for receipt by a transfer device 28 (FIGS. 2 and 2A). An operator, using the keyboard of PC 26, instructs the sequential wire processor 11 via its controller and via the handshake lines of the requirements for fabricating circuits for a current harness to be manufactured. This is described in detail hereinafter.

A personal computer (26) that has proved adequate for the task is a CompuAdd 333. This is a thirty-three megahertz 80386 based PC with four megabytes of RAM, an 80 megabyte hard disk drive, a 3.5 inch 1.44 megabyte floppy drive, a 5.25 inch 1.2 megabyte floppy drive, a fourteen-inch SVGA color monitor, an 8,000 Plus internal tape drive, two serial ports and a printer port. In addition, the computer is configured with three Opto 22 digital I/O interface boards, which have twenty-four channels per board. The software system of the computer includes the above handshake software, DOS 5.0, Windows 3.1, the Norton Utilities Version 6, Microsoft C Version 6.0, Multiline Interrupt Driver Version 3.0, X-Wear Version 3.1, and Mountain Filesafe Tape Version 5.2.3-TD.

Transfer device 28 is controlled through personal computer 26 working in cooperation with power/controller 24 to control the sequential transfer of "circuits" to an upstanding transportable carousel 32, or to a bin (not shown) when defective circuits are sensed in the sequential wire processor 11.

In addition, PC 26 connects to a carousel indexer, discussed in detail hereinafter, through two serial connection lines (not shown). The first line connects to a Compumotor ZX Indexer/Drive 155 (FIG. 9A), which performs vertical carousel indexing, again, as described in detail below. The second serial line connects in a standard daisy chain, an RS232 link, for example, to a pair of Digiplan BLX 75 servodrive positioners 143 (FIG. 10) which provide rotatable indexing of carousel 32. In addition to these lines. PC 26 connects through several digital inputs and outputs to transfer device 28 and the carousel indexer mechanisms. This requires a plurality of electrical/mechanical interface means (not shown) that permit electrical signals to actuate mechanical devices to control the supply of air to pneumatic actuators and air cylinders, as discussed in detail hereinafter. Hoses that supply the actuators and cylinders are not shown to avoid drawing clutter.

PC 26 also permits operator input to effect changes in the otherwise automatic operation of the carousel at the docking location adjacent transfer device 28.

Transfer device 28 is shown in perspective in the views of FIGS. 2 and 2A. It includes two main, movable, and relatively lightweight (aluminum) transfer carriage structures 40a and b located at the output end of the wire processor 11. The wire processor employs a series of inverted Y-shaped grippers 42 (only one of which is visible in FIG. 2) that travel along an overhead support structure (not shown) in processor 11. The grippers serially transfer cut-to-length, terminated circuits (48) through the processor, and travel above a channel 44 formed by two elongated, upstanding plates 46 that extend through the center of the wire processor. The circuits gripped by 42 usually have at least one loop of circuit wire 48 (in FIG. 2, numeral 48 is conveniently located to denote the loop of the circuit while simultaneously referring to the circuit as a whole) that travels in and through channel 44 on its way to the transfer device.

Figure 3:
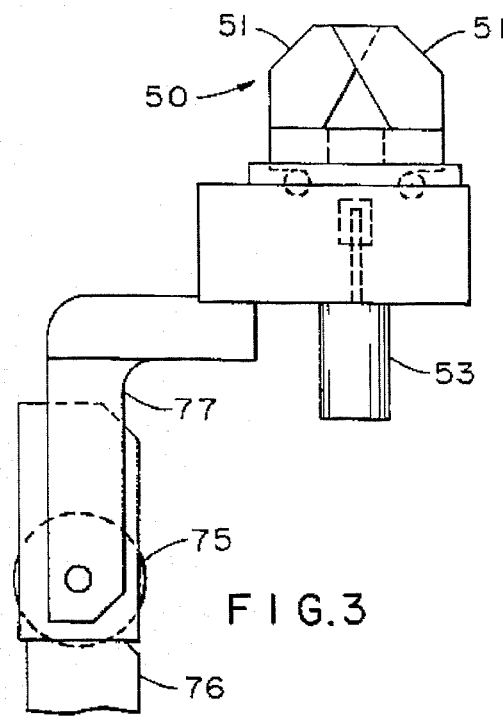
FIGS. 3 and 3A are side elevation views of a gathering jaw structure of the transfer device of FIGS. 2 and 2A for sequentially receiving circuits from the sequential wire processor.
Figure 3A:
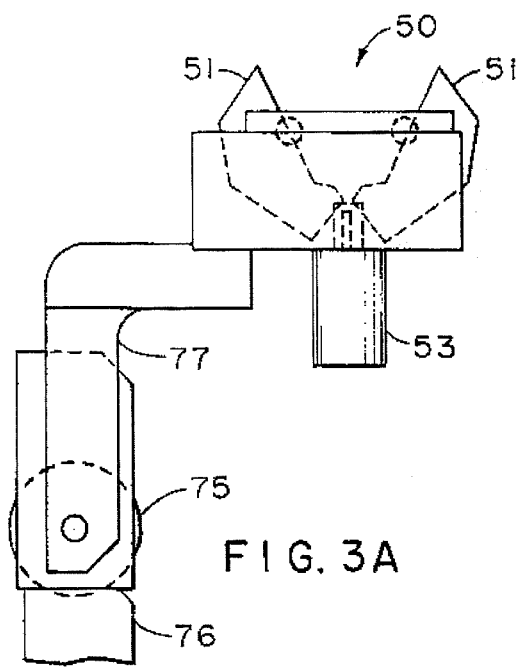

Transfer device 28 comprises multiple jaw means for locating, orienting and transferring "good" circuits 48 in a series of stages, and for disposing of defective circuits 48, as explained hereinafter, under control and supervision by PC 26. Initially, two sets of opposed jaws 50 (a set is located on each side of channel 44) gathers the ends of each circuit presented by the inverted Y grippers 42 when the last gripper reaches a position over jaws 50. The jaws close on the circuit by operation of pneumatic linear actuators 53, see FIGS. 3 and 3A, mechanically connected to opposed interleavable jaw fingers 51. FIGS. 3 and 3A of the drawings show actuator 53, linkage connecting the actuator to the interleavable jaws 51, and support structure for the jaws that are part of the transfer device 28 depicted in FIGS. 2 and 2A.

Before gathering jaws 50 close on a circuit 48 received from grippers 42, sequential wire processor 11 is informed over the handshake lines connecting controller 24 and PC 26 together that jaws 50 are, in fact, in place to receive the circuit from grippers 42. When jaws 50 are in place, controller 24 orders the grippers to release the circuit to the fingers 51 of jaws 50.

The ends of each circuit 48 are known to be within a certain tolerance region because of the known position of grippers 42 (known by controller 24 and PC 26 governing wire processor 11 and transfer device 28) but a more precise position of the circuit ends (terminals 49) needs to be determined for reasons presently to be explained. To this end, each gathering jaw 50 has a relatively broad gathering region that includes interleavable fingers 51. Fingers 51 close on the circuit to encompass a substantial portion of the circuit length near terminal 49. This locates circuit loop 48 in a center region between the jaw sets 50 (located on each side of channel 44) but leaves unspecified the orientation of terminals 49, as they may be affected by a twist in the circuit, for example.

This latter task is undertaken by a set of vertical orientation jaws 52 and 54 again with a set (52 and 54) located on each side of channel 44 and outwardly of gathering jaws 50. Jaws 52 of each set are in a retracted position when a circuit 48 reaches gathering jaws 50 and when gathering fingers 51 close on the circuit and thereby locate the circuit terminals over lower jaw 54. The gathering fingers are next opened by actuators 53 under orders from PC 26, which locate the jaws 50 in an open, downward position, as shown in FIG. 3A, to leave circuit terminals 49 (FIG. 2A) resting on the lower jaw surfaces 54. Upper jaws 52 are now rotated by pneumatic rotary actuators 56 (FIGS. 2 and 2A) toward jaws 54 and against terminals 49 under instructions from PC 26. The surfaces of the lower jaws 54 form solid bases or anvils which fix the vertical position of circuit terminals 49.

Figure 2B:
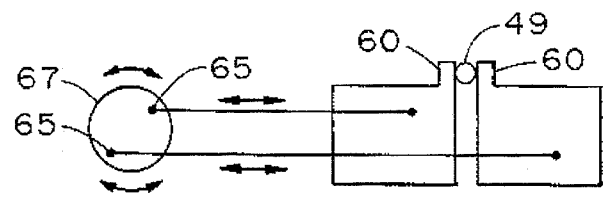
FIG. 2B is a diagrammatic representation of means for moving two terminal engaging fingers located in anvil surfaces of the transfer device.

Extending upwardly from the inner edge of each jaw anvil 54 are two projections 58 (FIG. 2A) that maintain a predetermined space between the upper jaws 52 and the lower anvil surfaces 54, a space provided to accommodate the thickness dimension of terminals 49. In addition, within each anvil 54 are two miniature upstanding horizontally translatable teeth or fingers 60 (FIG. 2A). The fingers protrude through slots 64 provided in the anvil surface and locate the edges of terminals 49 horizontally, thereby fixing the horizontal positions of the terminals disposed between jaws 52 and 54. A suitable mechanism for translating fingers 60 is shown schematically in FIG. 2B, wherein two miniature cylinders (not shown) are operated to push two pins 65 eccentrically mounted in a small sync wheel 67 to rotate the wheel. In FIG. 2B, the wheel has been rotated to close the pins on a terminal 49 in the process of horizontally positioning the terminal. Rotation of the wheel in the opposite direction translates fingers 60 away from each other to an original, spread apart position, see the upper and lower arrows in the figure.

With fingers 60 extending upwardly through slots 64, the rotation of upper jaw 52 by actuator 56 to terminal 49 abuts jaw 52 against projections 58 and 60. Two elongated recesses 68 (FIG. 2A) are provided in the upper jaw and into which the ends of fingers 60 extend when jaw 52 rotates to terminal 49.

Hence, vertical locating jaws 52 and 54 cooperate with fingers 60 to form a four-sided alignment fixture for locating terminals 49 both vertically and horizontally.

The jaw sets on each side of channel 44, as thus far described, rest on transfer carriage halves 40a and 40b, as seen in FIG. 2. These halves are translated simultaneously upwardly and forwardly at about a 30-degree angle along parallel bars 72 by cylinders 70a and b, respectively, and retract in the same manner, the bars and cylinders being located on and suitably affixed to rigid upstanding support plates 74. The pistons of the two cylinders are respectively mechanically connected to the carriage halves 40a and 40b.

Cylinders 70a and b rapidly and simultaneously move carriage halves 40a and b to a carousel 32 docked adjacent transfer device 28 for transfer of circuits 48 to the carousel or in the case of a defective circuit crimp 47 being sensed, the carriage halves move upwardly and forwardly to clear gathering jaws 50 such that the gathering jaws can be pivoted downwardly by rotary actuators 75 (FIGS. 3 and 3A) acting on arms 77 to release the defective circuit to a bin (not shown) located beneath the jaws. Each actuator 53 has a housing that is mounted on a fixed leg 76 while the rotatable shaft of the actuator is secured to movable arm 77.

Jaws 50 are returned to their original position by actuators 75, and the carriage halves 40a and 40b are returned to a position beneath the jaws by cylinders 70a and b to await another circuit 48 from wire processor 11. These actions are effected under the control of wire processor controller 24, which signals appropriate electrical/mechanical devices (not shown) provided to supply air to the various pneumatic actuators and cylinders described thus far.

Sequential wire processor 11 produces a completed circuit about every two seconds. This requires the transfer device 28 to receive, maintain circuit orientation and transfer the circuits to a carousel 32 at the same, repeatable rate. The transfer device is operated directly by PC 26 using the handshake lines and software discussed earlier.

Figure 2C:
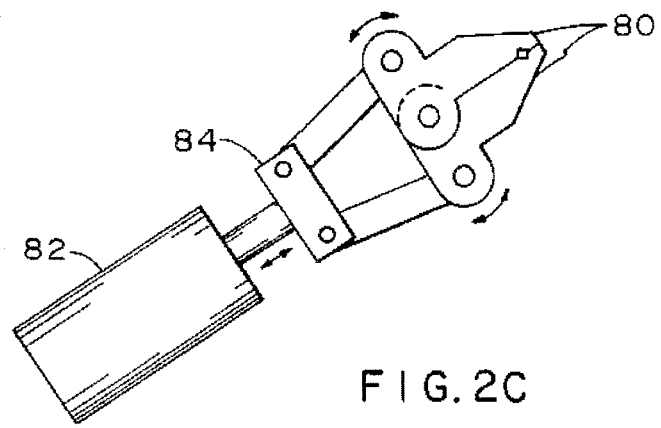
FIG. 2C is a diagrammatic representation of a transfer jaw in closed position, FIGS. 2 and 2A showing two such jaws in open position.

With circuit ends 49 vertically and horizontally located, left and right jaws 52 are rotated to the rest position shown in FIGS. 2 and 2A by their actuators 56, and fingers 60 retract to the original spread apart position in the left and right anvils 54 by rotation of sync wheel 67, all operated under control of PC 26. The oriented circuit 48 is now suspended between two sets of transfer jaws 80 located inboard of gathering jaws 50 and orienting jaws 52, 54, and adjacent panels 46. Jaws 80 are relatively small and light in weight, their purpose being to receive each completed circuit 48, maintain the orientation of terminals 49 and quickly place the same on a carousel 32. To this end, the jaws 80 are closed, again, pneumatically by a cylinder 82 (FIG. 2C) receiving pressurized air (cylinder 82 commonly operates jaws 80 through a yoke 84, which opens the jaws to the wide position depicted in FIGS. 2 and 2A when the shaft of the cylinder pulls the yoke back towards the cylinder).

Cylinders 70a and 70b are now fired to transfer carriage halves 40a and b, with a circuit 48 in closed jaws 80, to an open set of clips 85 located on a face of carousel 32. Cylinders 70a and b return the transfer device 28 to its original position after the circuit is placed in clips 85. Locating the circuit 48 in clip 85 is discussed below.

Figure 5:
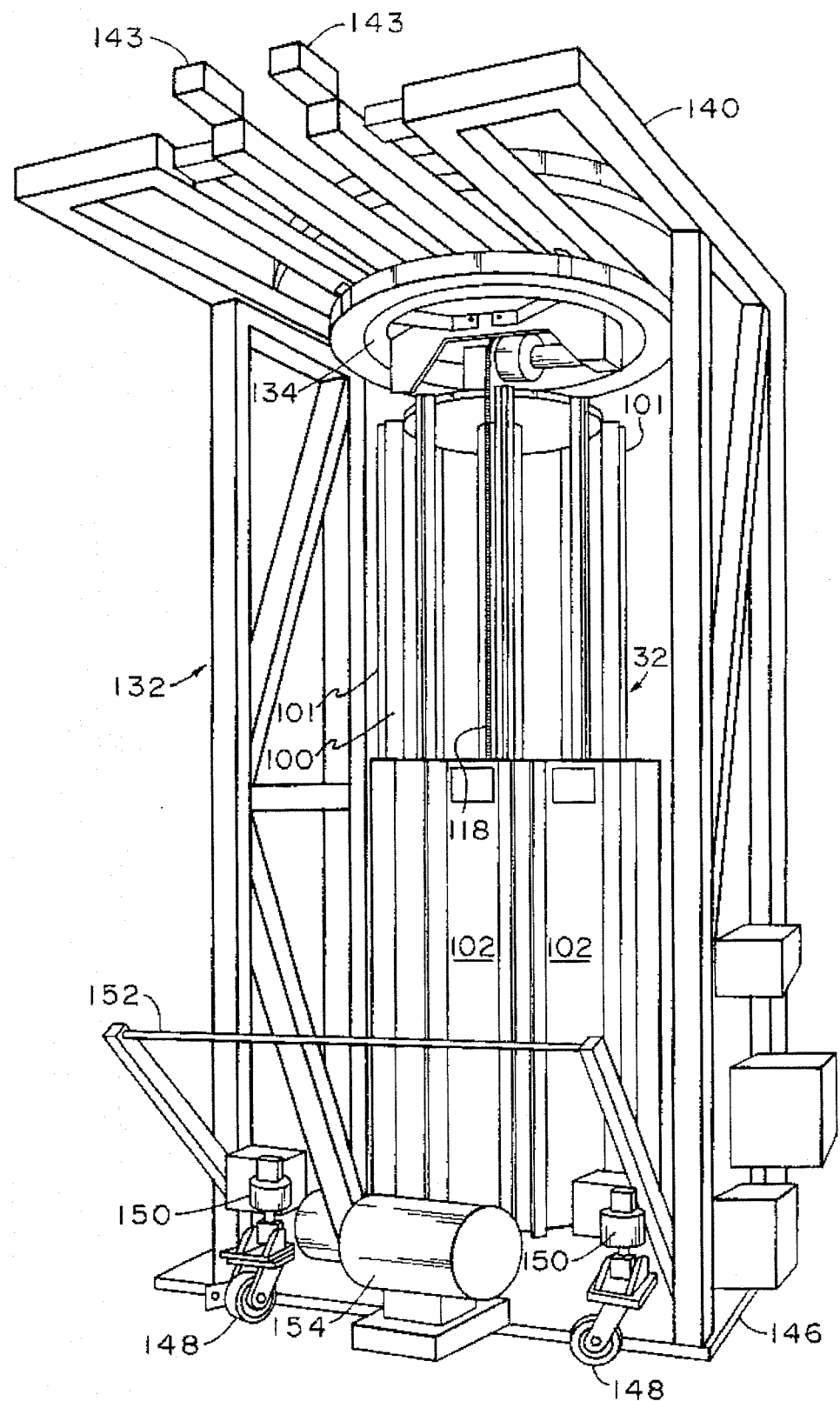
FIG. 5 is a perspective view of the carousel of the invention docked in place in a rigid frame structure provided at the location of the transfer device.
Figure 6:
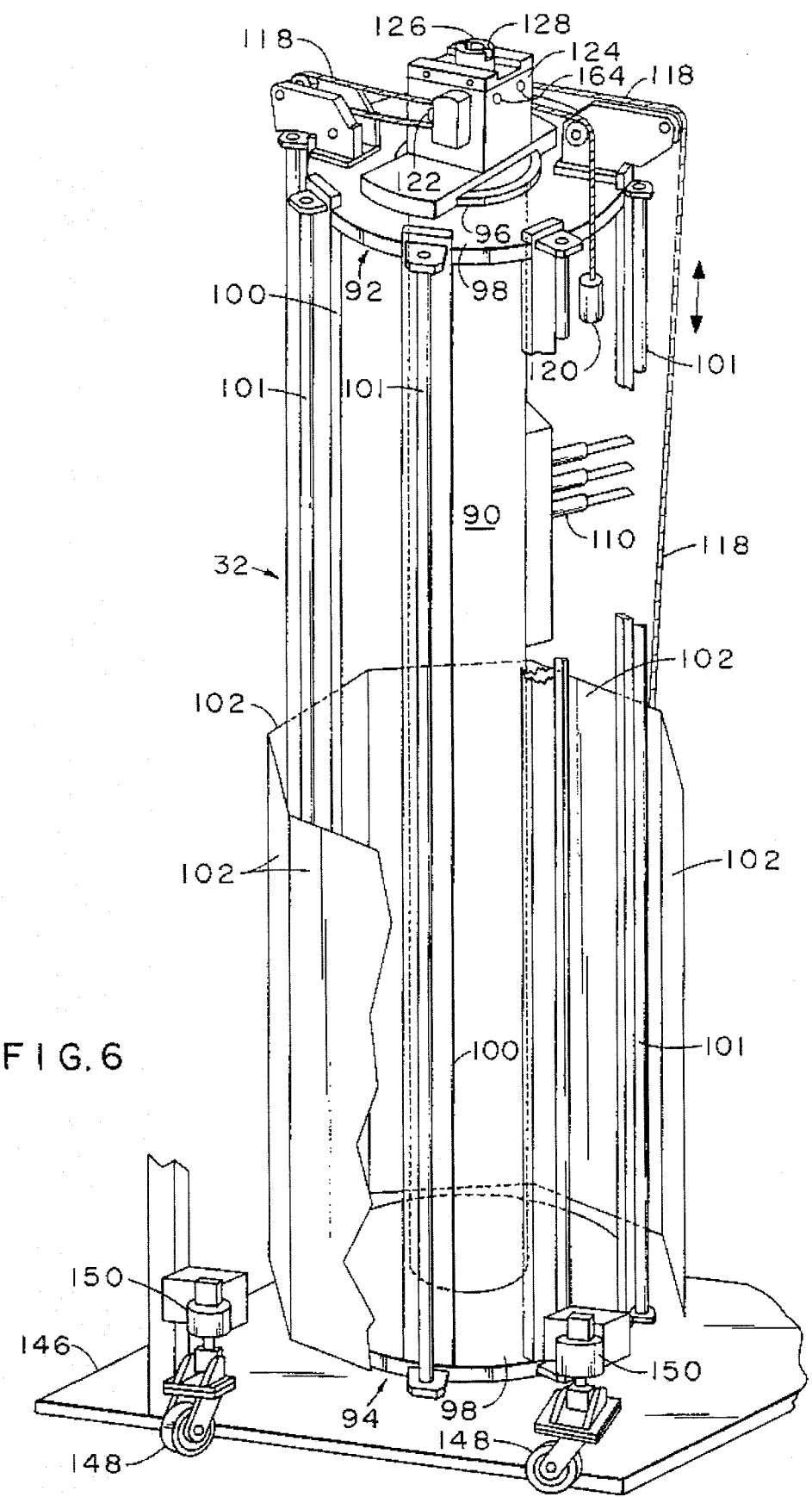
FIG. 6 is a somewhat schematic perspective view of inner components of the carousel of the invention and vertical indexing means.

The carousels 32 of the invention are identical in construction, one such carousel being depicted in FIG. 5 of the drawings and docked in place at one of the work stations 12, 14 or 18 (FIG. 1). In FIG. 6 of the drawings, inner portions of the carousel are revealed in somewhat schematic form, these portions including a basic inner frame structure comprised of a stationary center vertical beam 90 extending between and attached to an upper horizontal disc 92 and a lower horizontal disc 94. Each disc, in turn, comprises a center disc member 96 fixed to the respective ends of stationary beam 90, and outer annular members 98 rotatable on and around the fixed center discs, and held in place by vertical struts 100.

An outer frame structure of the carousel includes a plurality of the vertical struts 100 attached to the upper and lower outer rotatable members 98. Mounted on the outward face of each strut is a round bar 101 also extending between members 98.

Figure 4:
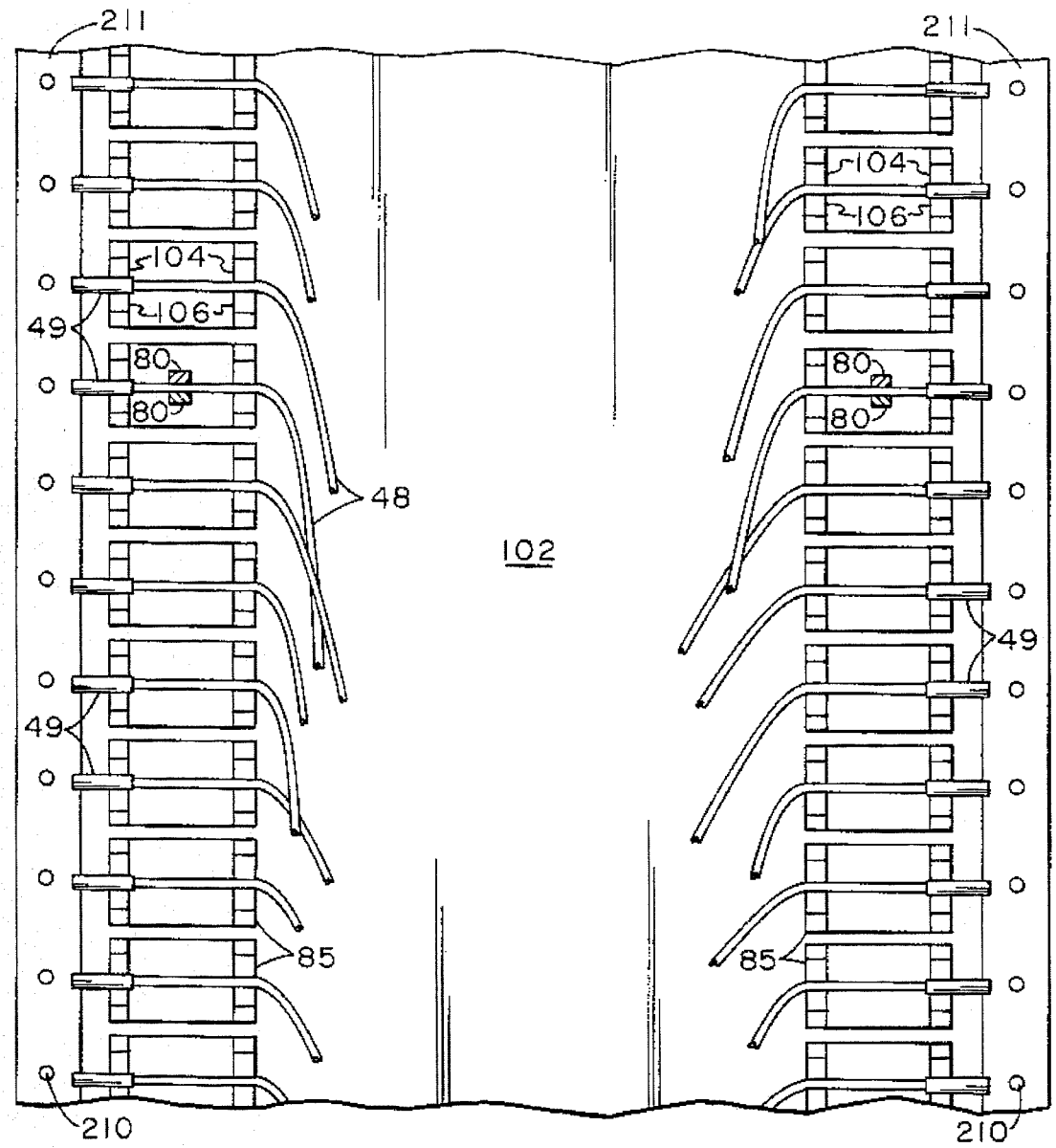
FIG. 4 is a partial view of one face of the transportable carousels of the invention containing a plurality of clips containing circuits (only partially shown) that have been placed on the carousel by the transfer device of FIGS. 2 and 2A.
Figure 7:
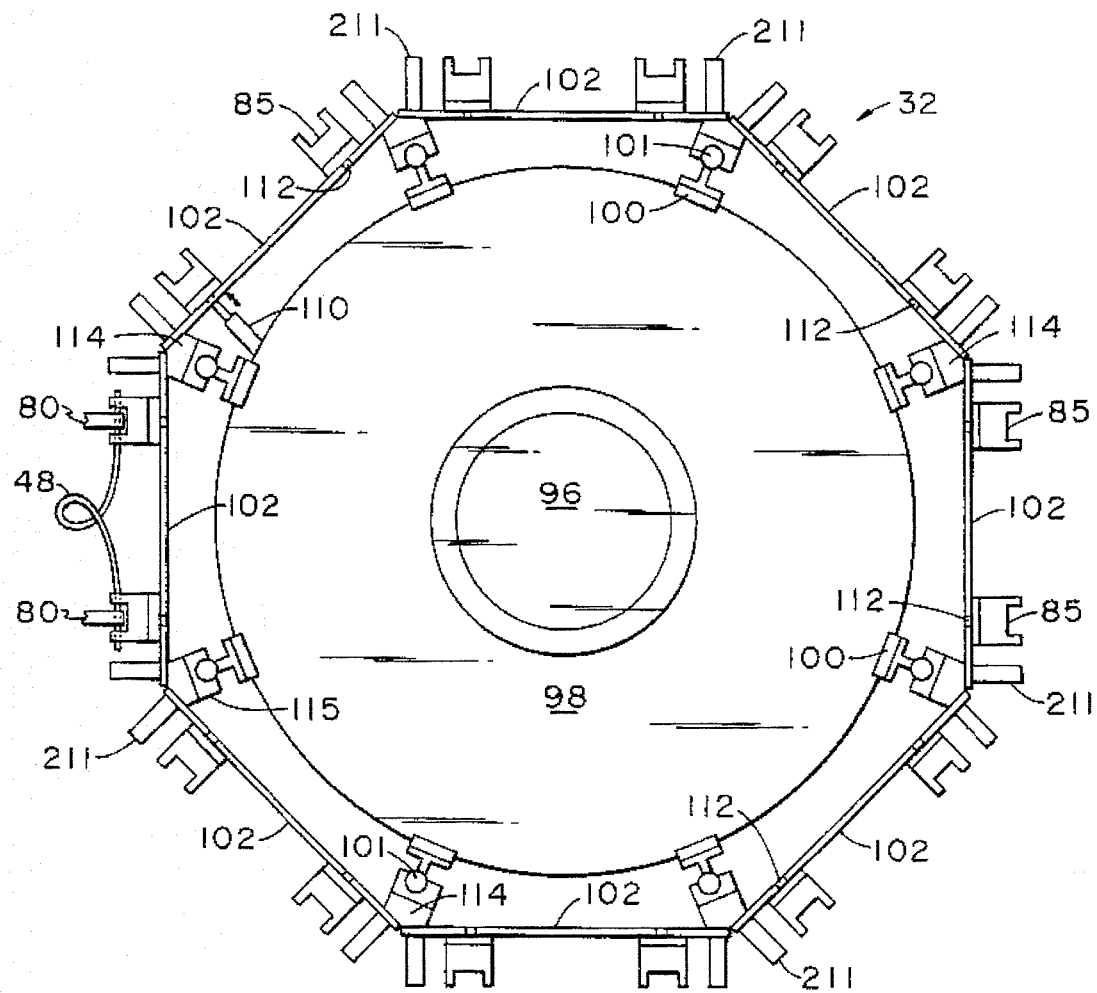
FIG. 7 is a plan view of the carousel.

As shown, carousel 32 has eight sides or faces comprised of metal plates or panels 102 (FIGS. 5 to 7) on which are mounted two rows of vertically aligned, outwardly facing clips 85 (FIGS. 4 and 7) adapted to serially receive circuits 48 from transfer device 28. More particularly, each face 102 of the carousel has an array of clip sets extending vertically along the edges of each face so that the clips can receive and grip circuits 48 and their terminal ends 49, as shown in FIG. 4. Each clip on each edge of each panel is comprised of two jaws 104 and 106, jaws 106 being movable and spring loaded at 105 (FIG. 8) while jaws 104 are fixed. The jaws are opened by wedges 108 (FIG. 8) mounted on center beam 90 (FIG. 6) behind the clips, which wedges are translated by respective cylinders 110. Wedges 108 are comprised of elongated bars with beveled ends, as seen best in FIG. 8, which enter the rear of the clips through openings 112 (FIG. 7) provided in panels 102. Three such wedges and cylinders are shown, though additional wedges and cylinders can be used to provide the system with additional flexibility, as explained hereinafter.

Panels 102 are joined together at their edges by elongated bars 114 having two surfaces angled to fit the angle provided by an octagon configuration, though the carousel of the invention may be other than eight-sided. Mounted on the rear surface of members 114 is a C-shaped bearing 115 that extends partway around each bar 101. Such bearings allow the panels to move vertically along the extent of the bars. The panels are raised and lowered on the bars as a unit by two bicycle type chains 118 (FIG. 6), each having one end attached to the upper edge of two panels 102 located on opposite sides of the carousel. The other ends of the chains are attached respectively to two weights 120 located inwardly of the panels, only one of which is visible in FIG. 6. Preferably, the weights are housed in an elongate hollow structure (not shown) mounted on the rear of two opposed struts 100.

Figure 9A:
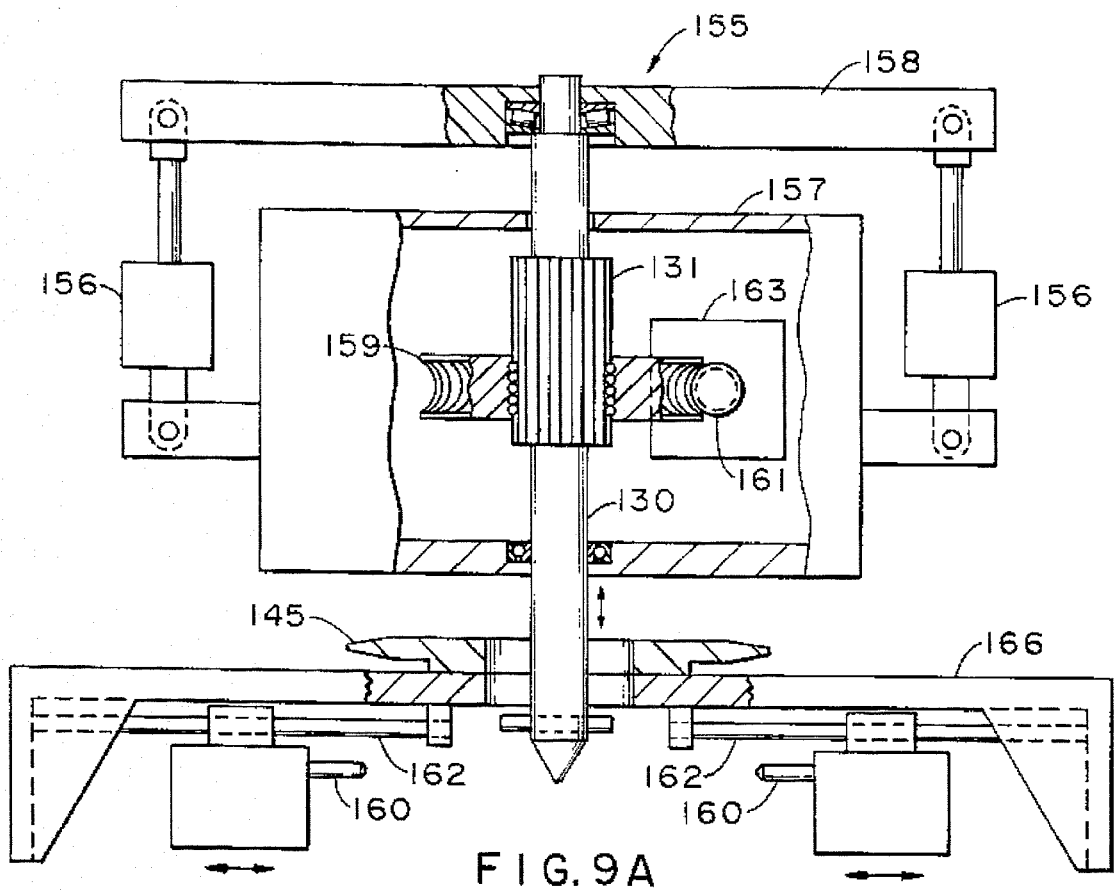
FIG. 9A is a schematic representation of a mechanism for raising and lowering a spline of FIG. 9 and for rotating the carousels of FIGS. 1 and 4 to 7.

Chains 118 travel over two sprockets 122 mounted on opposed ends of two parallel shafts (not visible in FIG. 6) extending from a gear box 124. The gear box is operated by a relatively short shaft 126 extending upwardly from the box, as shown in FIG. 6. The upper end of the shaft is provided with a slot 128 for receiving the "T" of a vertical spline shaft 130 (FIGS. 9 and 9A). Shaft 130 is an integral part of a spline 131 shown in FIG. 9A and discussed in detail hereinafter. The gear box rests on and is attached to upper annular member 98 (FIG. 6).

A rigid frame structure 132 (FIGS. 5 and 9) is located at each of the stations 12, 14 and 18 (FIG. 1) for receiving and docking a carousel 32. The frame supports, inter alia, an upper rotatable ring 134, as seen in the perspective view of FIG. 9, located in a fixed outer ring 138 attached to an upper frame portion 140 (FIG. 5) of 132. As best seen in FIG. 5, 140 extends forwardly of 132. On this forward extension are located two linear actuators 142 (FIG. 10) connected to the ends of a heavy duty drive chain 144. The actuators can be driven, respectively, by two NEMA 34 servomotors 143, for example, as shown in plan view in FIG. 10. Chain 144 extends around a sprocket 145 connected to an upper beam 166 (FIGS. 9A and 10) that extends crosswise of ring 134.

Each carousel 32 includes a lower rectangular steel plate 146 attached to the lower end of vertical beam 90 (FIG. 6). At the corners of the plate are located, respectively, four caster wheels 148 and four air cylinders 150, the shafts of which are connected to the wheels. Only two wheels and cylinders are visible in FIGS. 5 and 6. The air cylinders are effective to raise and lower the carousel, i.e., when the cylinders are pressurized, the carousel is raised from floor level on wheels 148 so that the carousel can be manually rolled on the floor. A handle bar 152 is provided for a workman to grasp for the moving process.

After a carousel is docked in place at the Insertion and Assembly Stations (11 and 16, respectively), quick-connect pads (not shown) are provided for connecting external pneumatic hoses (not shown) to internal conduits that supply air to pneumatically operated components of the carousel. These include wheel cylinders 150, which are supplied with air from an air supply external to the carousel to raise the carousel, and allows bleeding of the cylinders to lower the carousel to the floor.

A pressure tank 154 (FIG. 5) is provided on the base of the carousel to supply wheel cylinders 150 with air under constant pressure while the carousel is being moved between stations and thus disconnected from the external supply of air.

Before transferring circuits 48 from the wire processor 11 to an upstanding carousel 32, the carousel is moved manually into position adjacent the transfer device 28, as shown schematically in FIG. 1. This involves approximate centering of the carousel under T-shaft 130 and over an upstanding pointed pin (not visible in the figures). Base 146 of the carousel is provided with a recess (similarly, not visible in the figures) sized to receive the upstanding pin. With the carousel approximately centered, air is removed from cylinders 150. The wheels 148 retract upwardly to lower the carousel so that its base 146 will reach and rest on the floor of the building housing the apparatus of the figures. An inductive proximity sensor (not visible in the figures) located in the floor beneath the carousel senses steel plate 146 and thus the presence of the carousel, and signals PC 26 that panels 102 of the carousel are ready to be vertically indexed (positioned) to begin receiving circuits 48 from transfer device 28. Vertical indexing is provided by a spline assembly 155, which is shown somewhat schematically in FIG. 9A.

Spline assembly 155 includes T-shaft 130 which is now lowered on orders from PC 26 into slot 128 of gear box shaft 126 by actuator assembly 155. The T-shaft is an integral extension of spline 131 that is raised and lowered by two, opposed cylinders 156 connected between a structure 157 housing the spline, and an upper supporting yoke 158. Structure 157 also houses a worm gear 159 that engages spline 131, a worm 161 that drives the worm gear, a servomotor 163 for driving the worm and spline. Yoke 158 is mounted on ring 134 (FIG. 9) and above beam 166 in a manner not visible in the figures.

PC 26 now orders rotation of spline 131 via servomotor 163 and worm gear 159. The T of shaft 130 rotates shaft 126 in box 124 to index incrementally (raise or lower) panels 102 via translation of chains 118 (FIG. 6). This incrementally positions empty carousel clips 85 to sequentially receive circuits 48 serially from transfer device 28, as explained in detail below. The clips on face 102 of the carousel facing the transfer device sequentially receive circuits 48 from transfer device 28. Face 102 is indexed (moved) vertically by motor 163, spline 131 and gear box 124 each time a circuit 48 is received by transfer jaws 80 of the transfer device 28. In this manner, an empty open clip 85 is always presented to transfer jaws 80 each time the transfer jaws receive a circuit 48 from orienting jaws 52 and 54 of the transfer device.

Figure 8:
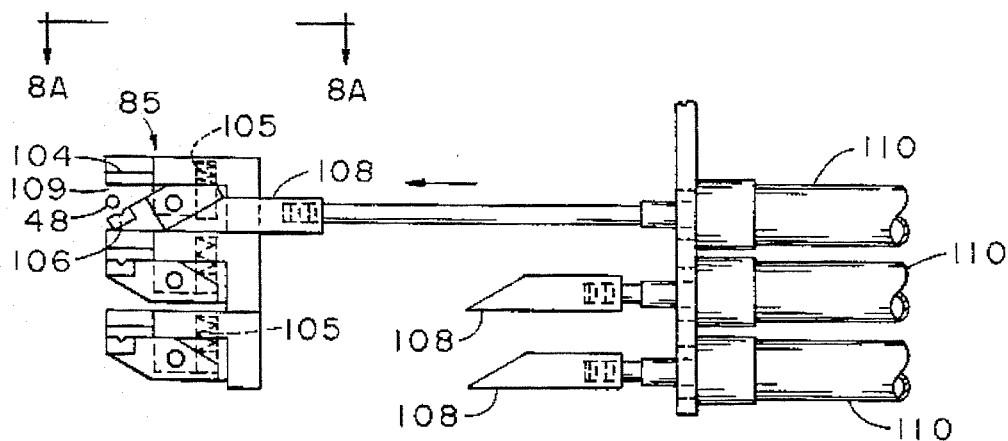
FIG. 8 is a side elevation view of three cylinder operated wedges for opening the clips of the carousel.

Each time transfer jaws 80 are posed to present a circuit 48 to an empty clip 85, cylinders 110 are operated via PC 26 to open jaws 104 and 106 of the clip so that jaws 80 can place the circuit in the open jaws of the clip. FIG. 8 of the drawings shows the opening of one clip by one wedge 108. The wedge enters beneath the lower jaw 106 and rotates the rear of the jaw upwardly, as the jaw is pivoted near the center thereof on a pin 107. This lowers the forward portion of the jaw which separates the forward portion from fixed upper jaw 104. This provides a space 109 between them to receive a circuit 48.

Figure 8A:
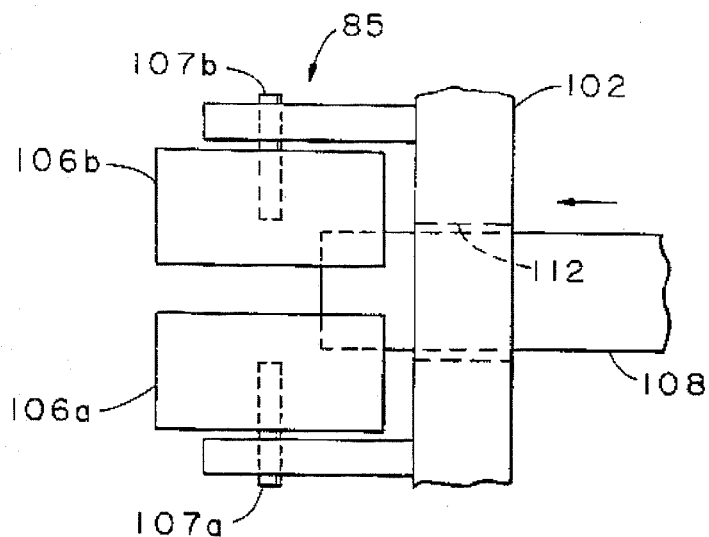
FIG. 8A is a partial plan view of one of the wedges and clips depicted in FIG. 8.

Preferably, lower jaw 106 of clip 85 comprises two, independently operable portions a and b mounted on pivot pins 107a and b, as seen in FIG. 8A. In this manner, jaw portion 106b is permitted to close on terminal 49 while jaw portion 106a closes on the insulated wire portion of circuit 48 (FIG. 4). Wedge 108, however, in FIG. 8A operates both portions simultaneously, as the wedge straddles the jaw portions.

When the circuit is lodged in the open clips, as seen in FIG. 8, PC 26 signals carousel to remove the beveled end of bar 108 (via a cylinder 110) from the rear of the clip so that the lower jaw of the clip closes on the newly received circuit.

Cylinders 110 are operated by air supplied to the carousel at Stations 12 and 18, i.e., after a carousel is moved into place in frame 132, quick connect hoses are manually inserted into receptacles,e as discussed above, connected to an external air supply. When the carousel is full, the hoses are manually disconnected so that the carousel is free to be moved from the station.

When a side or face 102 of a docked carousel is filled with circuits 48, it is noted by PC 26, which counts the number of circuit transfers, and orders rotation of the carousel to present the next empty side 102 to transfer device 28. The circuit presentation and receiving process begins anew until the empty side is filled with circuits 48.

Figure 10:
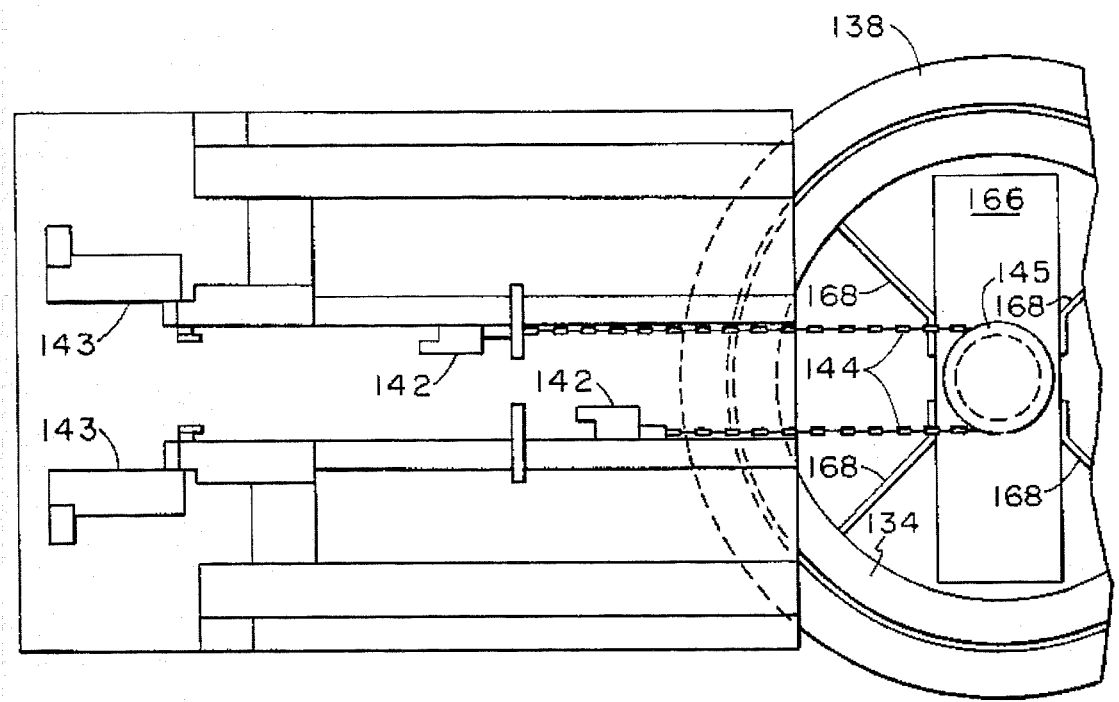
FIG. 10 is a partial top plan view of the apparatus of FIG. 9.
Figure 10A:
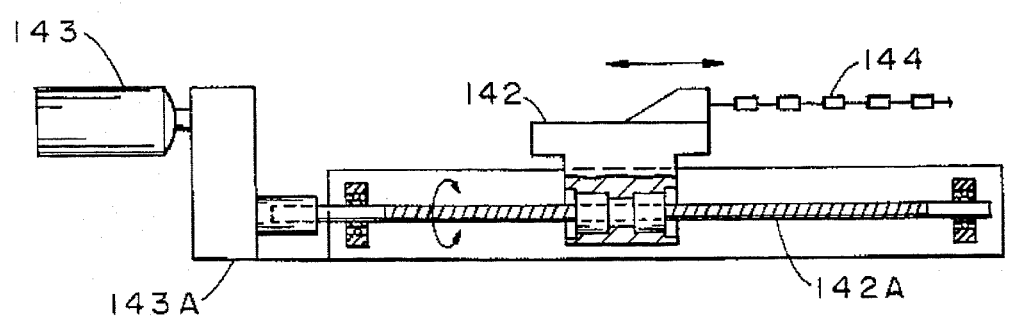
FIG. 10A is a diagrammatic representation of a linear actuator shown in FIG. 10.

Rotation of the carousel is effected by rotation of upper ring 134 (FIGS. 5 and 9) and beam 166, which are rotated by the translation of chain 144 acting on sprocket 145 (FIGS. 9A and 10). Beam 166 supports pins 160 and bars 162 above gear box 124. The pins are translated along the bars 162 (FIGS. 9 and 9A) by actuators not visible in the figures, on orders from PC 26, to enter into the openings 164 (FIG. 6) provided in the gear box. With the pin engagement of box 124, the whole carousel is rotated, along with spline assembly 155, when chain 144 (FIGS. 10 and 10A) is translated by linear actuators 142 (FIGS. 10 and 10A). The linear actuators are operated by motors 143 receiving orders from PC 26. When ordered, one motor operates to "let out" one end of the chain while the other motor pulls the other end. The rotation of gear box 124, which is mounted on annular member 98, rotates 98 and the carousel faces 102. The letting out and pulling of chain 144 provides rotational indexing of the carousel in a smooth, consistent manner. Linear actuators 142 are carriages that are translated along ball screws 142A (FIG. 10A) by the motors 143. The motors rotate the screws through respective gear boxes 143A.

The memory of PC 26 keeps track of carousel movements such that when all faces of the carousel are filled, or at least are indicated as being full by PC 26, PC 26 orders the raising of T-shaft 130 from gear box shaft 126 and retraction of pins 160 from gear box 124. PC 26 now orders reinflation of wheel cylinders 150 so that the carousel is raised from the floor surface on its wheels 148 for removal of the carousel from Insertion Station 12 to Inspection/Insertion Station 14 (FIG. 1 ). Before removal, the air hoses connected to the carousel are removed, and a workman grasps handle 152 (FIG. 4) of the carousel to roll the carousel to Station 14.

At Inspection/Insertion Station 14, the "full" carousel is visually inspected by a workman for any missed circuits, and he proceeds to open any empty clips with a hand-held device (not shown ). The Inspection/Insertion Station need not involve the intricacies of precisely locating the carousel, as required at the Insertion and Assembly stations, and thus is not provided with an air supply for operating wedging cylinders 110 and wheel cylinders 150. Air supply tank 154 maintains pressure to wheel cylinders 150, which maintains the carousel in a raised position on wheels 148. At the Inspection/Insertion Station, the workman manually inserts circuits into empty clips, and after such insertion, removes the hand-held device, which then allows closing of the clip jaws on the inserted circuits. Further, if the harness to be made requires twisted wire circuits, the workman also inserts these into empty clips on the carousel faces.

A personal computer 170 (FIG. 1) is provided at Inspection/Insertion Station 14 to interface with a carousel controller (not shown). The workman uses the keys of the keyboard of computer 170 to advance the carousel from one face to another and to raise and lower the faces via the controller acting through chains 118, a gear box 124 and an actuator 155 located in a frame 132 at the location of the inspection station. These are not shown at Station 14, since they are the same as those depicted in FIGS. 5, 6, 9, 9A, 10 and 10A.

PC 170 is also a CompuAdd 333 personal computer and has the same hard drive and floppy disk system described above in connection with PC 26.

With completion of the processes of the Inspection/ Insertion Station 14, the inspected carousel is removed from the frame 132 at the Inspection/Insertion Station and moved by a workman to either a buffer location between the Inspection/Insertion Station and the robotic station 18 (of Assembly Line 16) or to the robotic station if the robotic station is empty. At the robotic station, circuits 48 are sequentially removed from the carousel faces, as discussed in detail below, and transferred to the location of connector blocks 180 located on a perforated formboard 182 (FIGS. 11, 12 and 20) where circuit ends 49 are inserted into the connector blocks.

Figure 11:
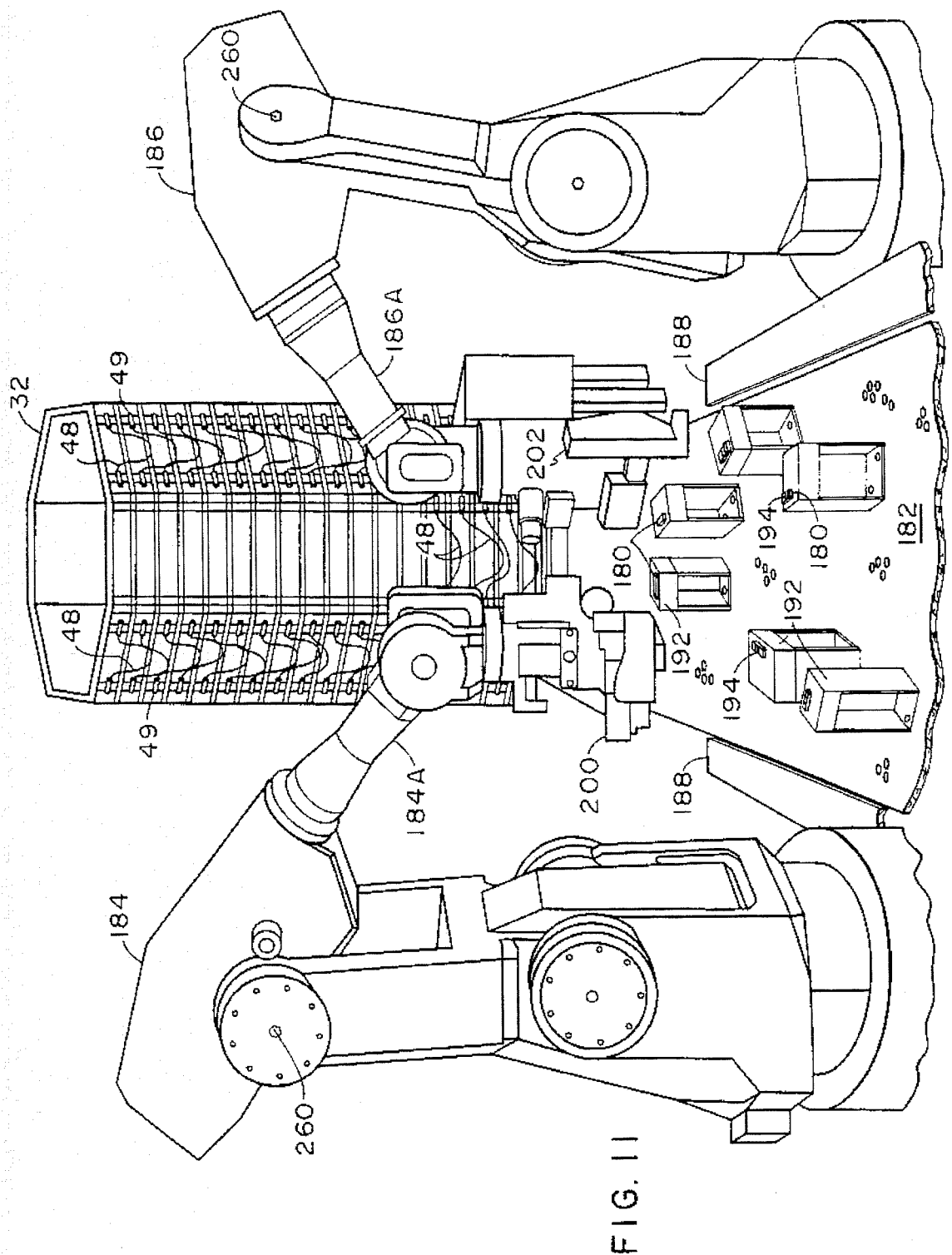
FIG. 11 is a somewhat diagrammatic view of two robots at a robot station facing in the direction of a carousel that is docked at the robot station for removal of circuits from the carousel by two end effectors of the robots.
Figure 12:
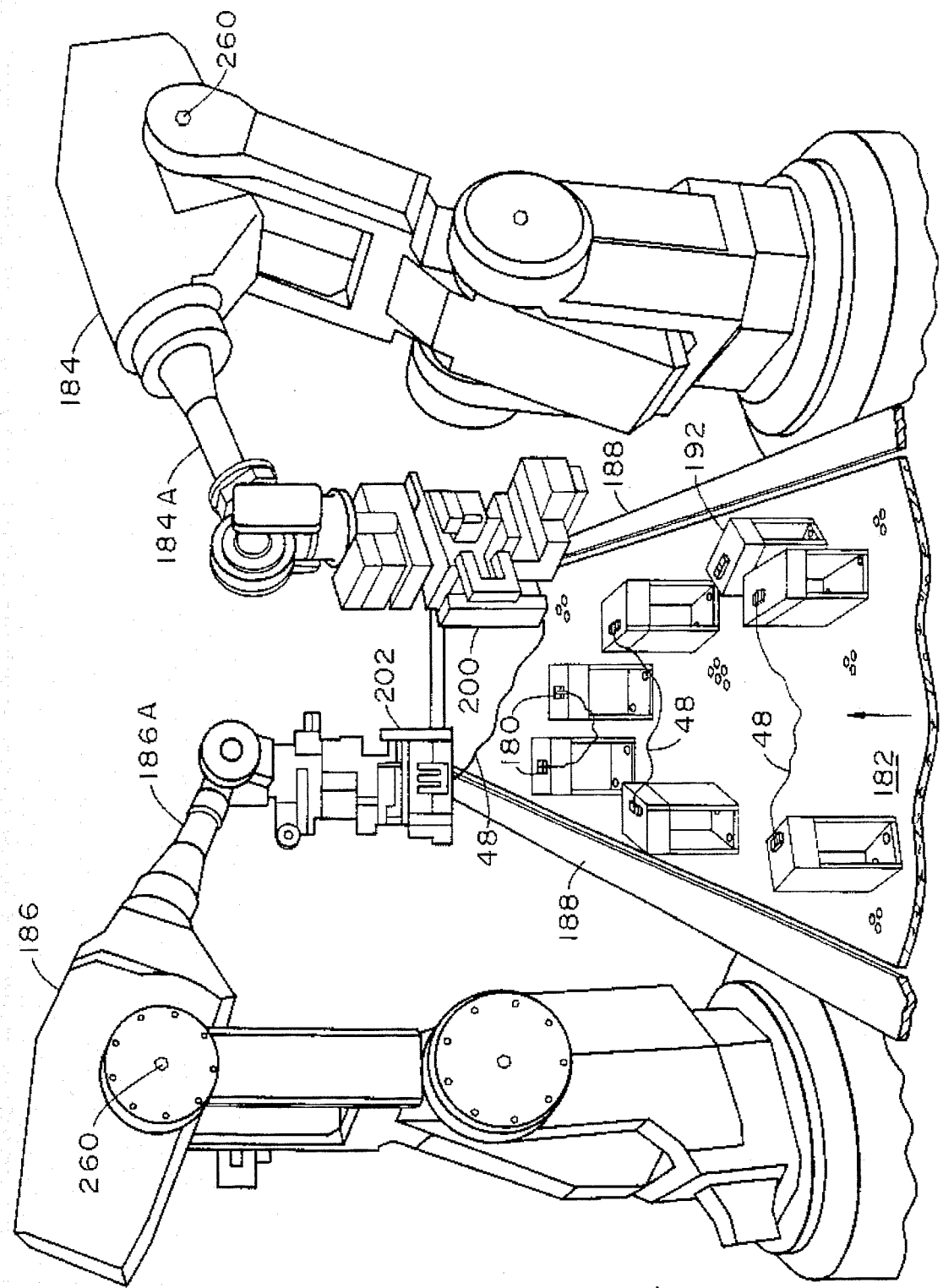
FIG. 12 is a view of the robot station of FIG. 11 facing in a direction away from the carousel, the view showing a circuit gripped by the end effectors of the robots, and circuits with their terminal ends already inserted into two connectors by the robots.

FIG. 11 shows two robots 184 and 186 located on opposite sides of a formboard 182, which rests on a horizontal conveyor 188, only the edges of which are visible in FIGS. 11 and 12. Robots suitable for the purposes of the invention, and which have been tried and used successfully, are GMF-700s each controlled by a KAREL R/H controller 196 shown only diagrammatically in FIG. 1, though other robots and control systems can be used. As seen in FIGS. 11 and 12, the robots are rotatable on a multiple of axes beginning at their bases and ending at jaw carriages 205 (FIG. 13) discussed in detail hereinafter. Electrical motors are located at the axes to relatively rotate the components mechanically joined at the axes on instructions from KAREL controllers 196.

A personal computer 198 is connected to KAREL controllers 196 via digital handshake lines, RS232 ports for standard daisy chain links, and software that permits communication back and forth between the controller and computer. This allows operator input to the controller. Such software includes DOS 5.0, Windows 3.1, the Norton Utilities Version 6, Microsoft C Version 6.0, Multiline Interrupt Driver Version 3.0, X-Wear Version 3.1, and Mountain Failsafe TAPE version 5.2.3-TD.

Like PC 26, PC 198 can be a CompuAdd 333. This is (again) a thirty-three megahertz 80386 based PC with four megabytes of RAM, an eighty megabyte hard disk drive, a 3.5 inch, 1.44 megabyte floppy drive, a 5.25 inch, 1.2 megabyte floppy drive, a fourteen-inch SVAG color monitor, and 8000 Plus internal tape drive, two serial ports, and a printer port. In addition, the system is configured with a PLUS-44-channel serial expansion card and three Opto 22 digital I/O interface boards.

Additional software is used in PC 198 to facilitate communication with robot controllers 196. This includes an Off-Line Programming Software (OLPC), KSC-PCRH KAREL Communication Software, and the GMFCOMM Communication Software for the GMF-700 robots. GMF-COMM Communication Software provides low level communication service. OLPC provides KAREL language translation on PC 198, file transfers between the KAREL controller and the PC, remote directories of KAREL controller files in the PC, and so forth. The KCS-PC KAREL Communication Software provides a C-language library which allows the remote reading and writing of variables, stopping and starting robot programs, and so forth.

Figure 21:
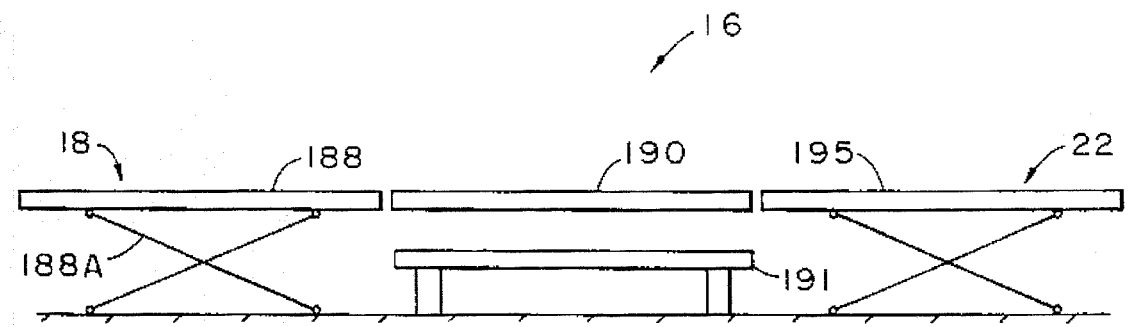
FIG. 21 is a diagrammatic, side elevation view of a conveyor system of the invention.

Fixedly and strategically located on formboard 182 at the robotic station 18 are a plurality of fixtures or mounting assemblies 192. These fixtures are secured to the perforated formboard by suitable fasteners not visible in the figures and each fixture holds a connector block 180 having at least one opening or cavity 194 (FIG. 20) for receiving a circuit terminal 49. Empty connectors are manually disposed in fixtures 192 at a location downstream from the robot station, i.e., at the end of a third horizontal conveyor 195 located in line with an intermediate upper horizontal conveyor 190, as shown in FIGS. 1 and 21. Conveyors 188 and 195 are end sections of a conveyor system that conveys formboards to and from robotic station 18.

The system shown generally in FIGS. 1 and 21 employs two intermediate, upper and lower conveyors 190 and 191 and elevator apparatus for lowering and raising end section conveyors 188 and 195. Scissor lifts 188A and 195A (FIG. 21) can be used for this purpose, the scissors being operated respectively by two motors (not shown). A controller 193 operates the conveyors and scissors in response to robot controller 196.

At work area 22 (FIGS. 1 and 21), connector blocks 180 are placed in the fixtures 192. Each formboard is then sent to robot station 18 over lower conveyor 191. This requires lowering end section conveyors 188 and 195 to the level of 191, i.e., 195 is lowered and sends the formboard to the robot station on conveyor 191. A sensor (not shown ) stops the formboard short of 188 if the robots are currently plugging circuits 48. After the robots are finished, controllers 196 signal conveyor controller 193 to send the formboard to conveyor 190 and to lower conveyor 188 to receive the waiting formboard. When the formboard is received by conveyor 188, the formboard passes an optical sensor (not shown) located on 188 that signals controller 193 to raise the conveyor to assembly position by scissors 188A (FIG. 21 ) to begin the insertion process.

Figure 22:
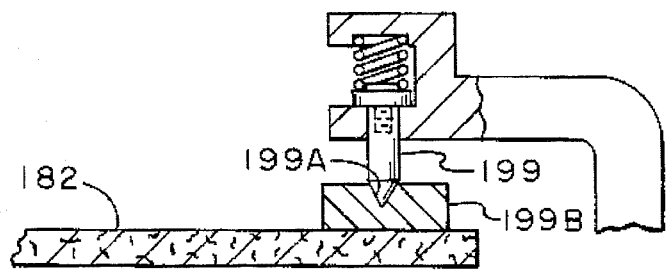
FIG. 22 is a partial sectional view of means to locate and fix a formboard relative to the insertion robots of FIGS. 11 and 12.

When the formboard is raised into assembly position, fixed darts 199 (FIG. 22) located near the edges of conveyor 188 seat into recesses 199A of receptacles 199B that are located on and preferably near the four corners of each formboard; only one dart and receptacle are shown in FIG. 22. The darts and receptacles properly locate and fix the formboard and its connectors 180 in X-Y positions relative to robots 184 and 186 for the insertion process. The X-Y positions are known by the robotic software.

Robots 184 and 186 have respective end effectors generally designated by numerals 200 and 202. For purposes of clarity, the end effectors are shown somewhat schematically, and electrical cabling for sensors and tubing for air actuated actuators are not shown so as not to obscure their presentations in FIGS. 11 to 15.

Figure 13:
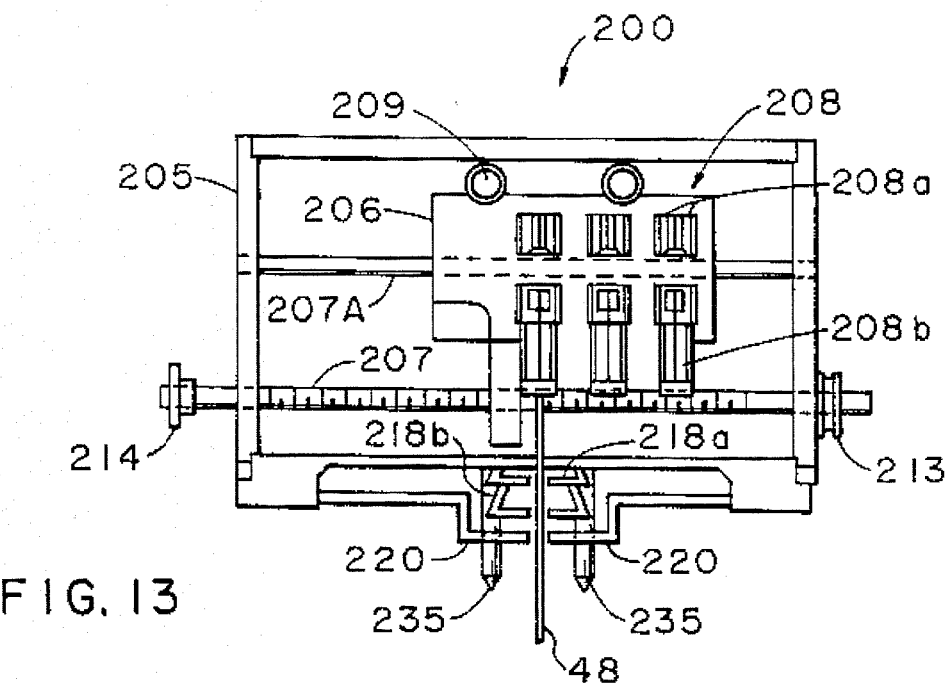
FIG. 13 is a somewhat diagrammatic view and front elevation of one of the end effectors of FIGS. 11 and 12.
Figure 14:
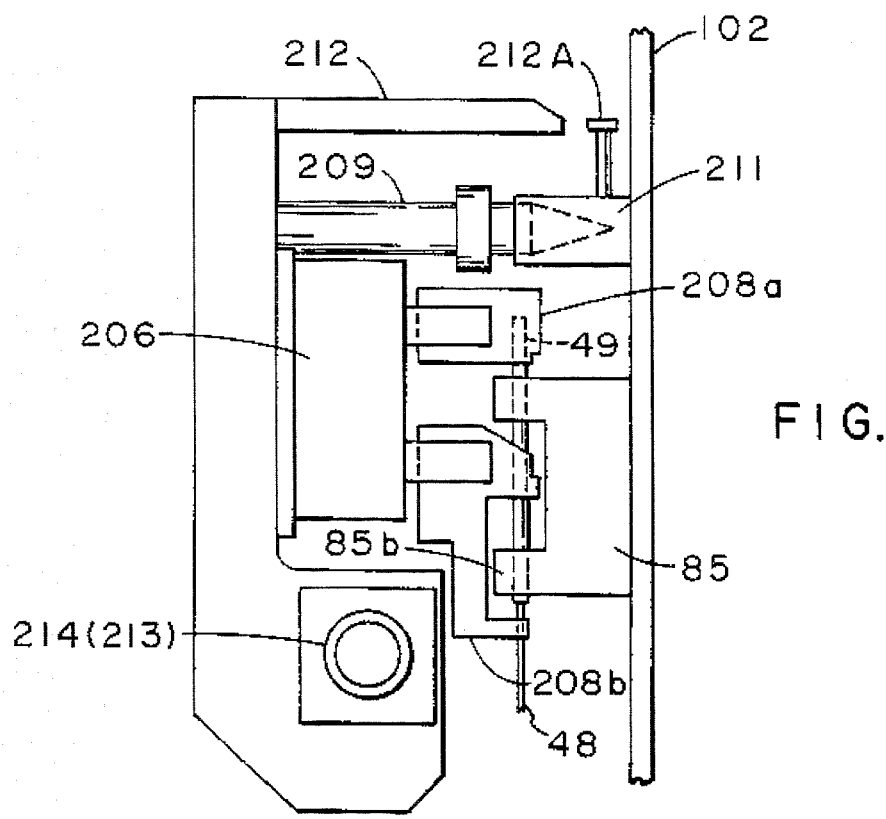
FIG. 14 is a plan view of the end effector of FIG. 13 and a clip of FIGS. 4 and 7, and presentation jaws of the end effector disposed to remove a circuit from the clip.
Figure 15:
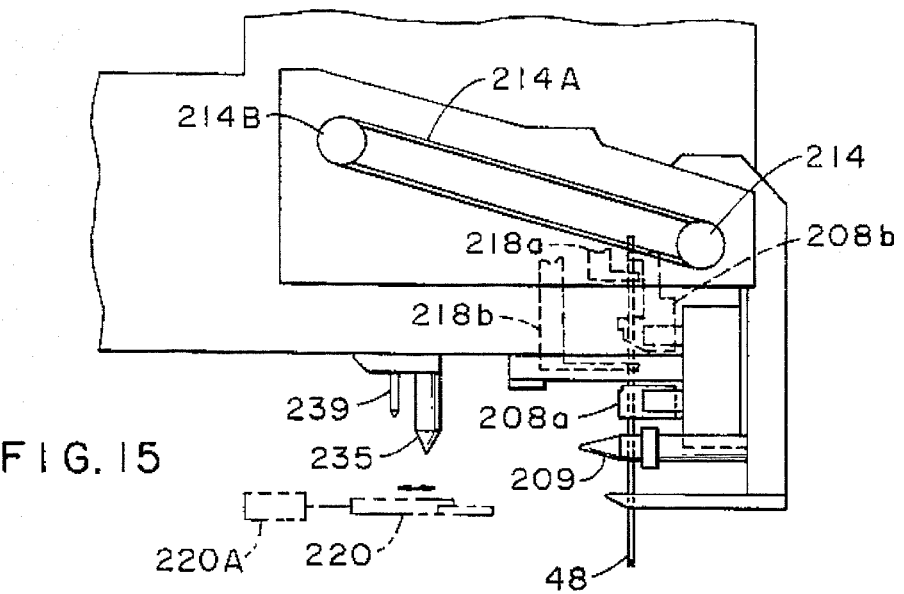
FIG. 15 is a side elevation view showing the presentation jaws rotated downwardly to a location adjacent centering and insertion jaws of the end effector.

Each of the end effectors 200 and 202 includes a jaw carriage 205 (FIG. 13) that contains a second carriage 206 containing six compact components in the form of six small jaw sets 208 operated respectively by six miniature air cylinders (not shown). These components are commercially available, Robohand, Inc. of Trumbull, Conn. being one such manufacturer of the components. Carriage 206 is mounted for translating on a threaded shaft 207 and a bar 207A extending parallel to the shaft. Jaws 208 are "presentation" jaws located in three laterally disposed locations (FIG. 13) and are comprised of upper and lower jaw sets 208a and b. FIG. 14 shows in plan view jaws 208 located in a clip 85 (of carousel 32) for removal of a circuit 48 from the clip (and carousel). The robots 184 and 186 present these jaws to the faces of a carousel 32 docked in a frame 132 located at one end of a conveyor 188 and a formboard 182 (FIG. 11 ). With the carousel properly docked, as explained earlier, controllers 196 are informed of the docking again via a proximity sensing device located in the floor beneath the carousel, and the robots move the end effectors 200 and 202 to the face and clips of the docked carousel.

Each end effector is rotated on respective arms 184A and 186A (FIG. 11) on orders from 196 to locate the three jaws 208 of each end effector in horizontal alignment with the ends of up to three circuits 48 held in three clips 85 (FIG. 4) of the carousel. The jaws are in an open position to receive the circuits and their terminals 49, on instructions from controllers 196, and to enter into jaws 104/106 of the clips, as seen in FIG. 14. Alignment is completed when two outwardly directed pins 209 located on carriage 205 enter into openings 210 (FIG. 4) provided in elongated vertically disposed strips or docking blocks 211 located on each carousel face 102 outside of but in close proximity of each array of clips 85. The docking is sensed by a proximity sensor 212 located adjacent pins 209, as seen in FIG. 14, and a steel screw 212A located at the side of blocks 211. The sensor senses the steel of the screw and signals controllers 196 to stop robot motion and allow circuit transfer. The software of controllers 196 now orders the opening of jaws 104 and 106, which is (again) effected by the bevel ends of bars 108 (FIG. 8) being thrust in between the rear portions of jaws 104 and 106 of up to three clips 85 disposed opposite the three presentation jaws 208 by cylinders 110. FIG. 14 shows a presentation jaw set 208 located in and about clip 85, with a circuit 48 and terminal 49 located in the jaws of the clip, and 49 and 48 located also in presentation jaws 208a and b, respectively. The presentation jaws comprise a narrow set 208a that receives terminal 49, and a bifurcated set 208b (FIG. 14) that receives circuit 48 at two locations astraddle an inner leg 85b of clip 85.

Figure 16:
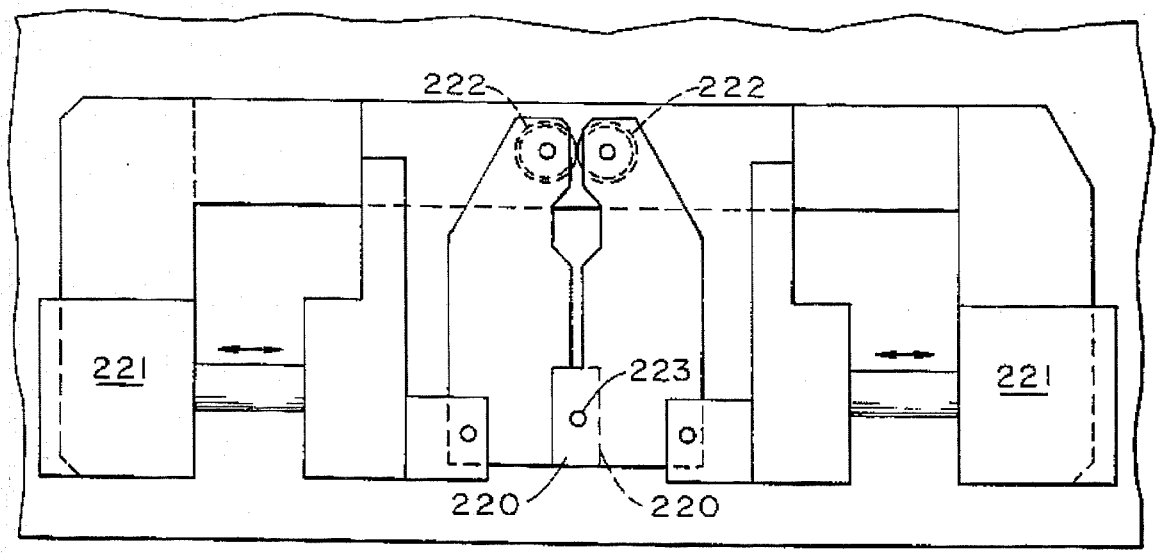
FIG. 16 is a plan view of the centering jaws that are a part of the end effector depicted in FIGS. 13 and 15.

The software of controllers 196 now orders jaws 208 to close on circuits 48 and terminals 49 (and orders cylinders 110 to open clip jaws 104/106), jaws 208 maintaining the orientation of terminal crimps 47 provided by carousel clips 85. The closing of jaws 208 is noted by the software of the controller and the robots now move end effectors 200 and 202 away from open clip jaws 104/106 and from the carousel face, with up to three circuits 48 strung between the end effectors, and sequentially to positions over up to six of the connector blocks 180 fixed on a formboard 182. The six positions of the two end effectors over six connector blocks are sequentially sought two at a time by the software of controller 196, 196 ordering the end effectors over a first two of the connector blocks 180, i.e., one connector block for each circuit terminal 49. Robot arms 184A and 186A are now rotated 90 degrees to orient circuits 48 and terminals 49 vertically (FIG. 13). Pulley 214 (on the left in FIG. 13) operates threaded shaft 207 (on which carriage 206 containing presentation components 208 is threadably mounted) to translate and align a first set of jaws 208a and b and circuit 48 with the center of insertion and centering jaws 218 and 220 located on a lower portion of each end effector. Pulley 214 is operated by a belt 214A and electric motor 214B (FIG. 15) on orders from a controller 196. Upon the alignment of the circuit with jaws 218 and 220, 196 instructs a second electrical motor (not shown) to operate a second pulley 213 (FIG. 13) to rotate carriage 205 one hundred and eighty degrees downwardly (FIG. 15) to present the first one of the three circuits 48 to the two sets of jaws 218 and 220. The lowest set of the jaws in FIGS. 13 and 15, namely, jaws 220, are centering jaws, which move to and close on circuit terminal 49 to center the terminal beneath jaws 218 and over a cavity 194 (FIG. 20) of a connector block 180. A plan view of the centering jaws is shown in FIG. 16. Pneumatic cylinders 221 are operated to open and close jaws 220, still referring to FIG. 16, on the terminal while the miniature cylinders in components 208 open the jaws 208a and b located over jaws 220, all under instructions from controller 196.

Centering jaws 220 comprise two jaws that oppose each other, as seen in FIG. 16, and are pivoted about the centers of two gears 222 that are meshed together to provide suitable control of the jaws that control the process of centering a terminal 49 over a cavity 194. In addition, the jaws overlap in the manner of jaws 50 (FIG. 3) to, again, properly locate terminal 49 in an opening 223 formed by the overlapping jaws.

The upper set of jaws 218 are jaws that actually insert terminals 49 into connector cavities 194. These jaws close on terminals 49 by operation of pneumatic actuators 224 (FIG. 18), and the centering jaws 220 open by operation of cylinders 221 (FIG. 16) to release the terminal for insertion into a connector cavity by the insertion jaws. Jaws 220 are also horizontally retracted from the insertion jaws 218 by an actuator 220A to clear the way for the insertion process. This is shown schematically in FIG. 15. The robot is operated to lower each end effector 200 and 202 toward two respective connector blocks 180 to begin the process of inserting two terminals 49 into the respective cavities 194 of two blocks 180, all under the instructions of controller 196.

Insertion jaws 218 comprise independently operated upper and lower sets a and b (FIG. 17) that function to "inch" each terminal 49 into a connector cavity 194. Both sets of insertion jaws 218a and b open and close on a circuit 48 in the manner shown in FIG. 18, i.e., each jaw a and b operates about respective sets of pivot pins 225 by cylinders 224 acting through a respective yoke 226 commonly and pivotally connecting the jaws of "a" and "b" to the cylinders. LVDT transducers 227 (only one of which is shown in FIG. 18) respectively sense the open and closed positions of the jaw sets and inform controllers 196 of such positions.

Figure 17:
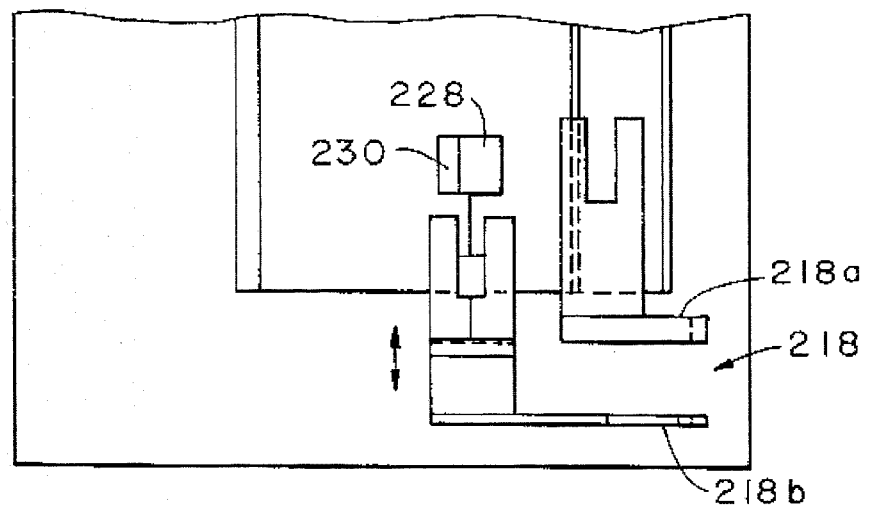
FIG. 17 is a side elevation view of the insertion jaws of the end effector of FIG. 13.
Figure 18:
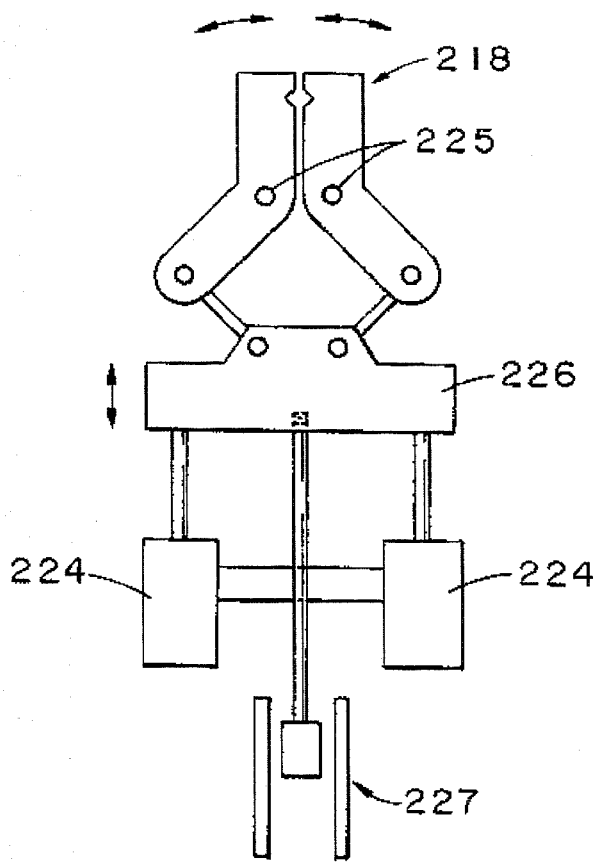
FIG. 18 is a plan view of the insertion jaw set of FIG. 17 showing certain operating linkage and a closure LVDT.

The upper insertion jaw set "a" is vertically fixed while the lower set "b" is mounted in a manner that allows it to move up and down in relation to the first jaw set under operation of a cylinder 228 (FIG. 17). Cylinders 224, yoke 226 and LVDT 227 (FIG. 18) move up and down with the lower jaw set. In addition, the upper jaw set "a" is operated by cylinders 224 in a manner that allows the jaw set to remain closed, yet provides no substantial gripping force on terminal 49. This allows the lower jaw set "b" to firmly grasp (by operation of its cylinder set 224) and to pull circuit 48 through the upper jaw set with a force sufficient to move terminal 49 downwardly by operation of cylinder 228 and into a connector cavity 194. A Hall effect sensor 230 located on cylinder 228 senses the position of the cylinder's piston (not visible in FIG. 17), which is made of a magnetic material, to verify that each stroke of the lower jaw set "b" has reached an end point of available travel. The sensor informs controller 196 of lower jaw travel, and 196 orders the lower jaw set to release the terminal and to move upwardly to regrasp the terminal at a higher location while the upper jaw set continues to lightly grip the terminal. This keeps control of the circuit and terminal during the insertion process. In this manner, each terminal is incrementally inserted, and terminals of different lengths can be incrementally and fully inserted in this manner.

In inserting a terminal 49 in a connector cavity 194, two docking pins 235 (FIGS. 13 and 15) mounted on the end effectors behind insertion jaws 218 enter into two openings 237 provided in fixture 192 (FIG. 20), while two vertical locating pins 239 (FIG. 15) on the end effectors touch the upper surface of fixture 192 to sense the correctness of the height of the connector block. If the fixture surface, and thus the connector surface, is not at the "correct" height, which is a datum contained in the software of controller 196, 196 orders cessation of the insertion process until the height of connector block can be manually corrected.

If the fixture 192 is not properly located with respect to the centering and insertion jaws 220 and 218, pins 235 touch the upper surface of the fixture. This is sensed by a sensor, such as an LVDT 240 located between the end effector and a compliant system 242 preferably in the manner shown schematically in FIG. 19. The LVDT signals an error recovery search algorithm in the software of controller 196 when docking pins 235 touch the upper surface of fixture 192, which then orders the robot to move the end effector about the connector block and in a routine that searches for openings 237 and thus the connector cavity 194. This occurs a prescribed number of times, after which the routine is stopped if the openings are not found. Insertion jaws 218 are then opened to drop the circuit to the formboard on orders from the search algorithm.

Figure 19:
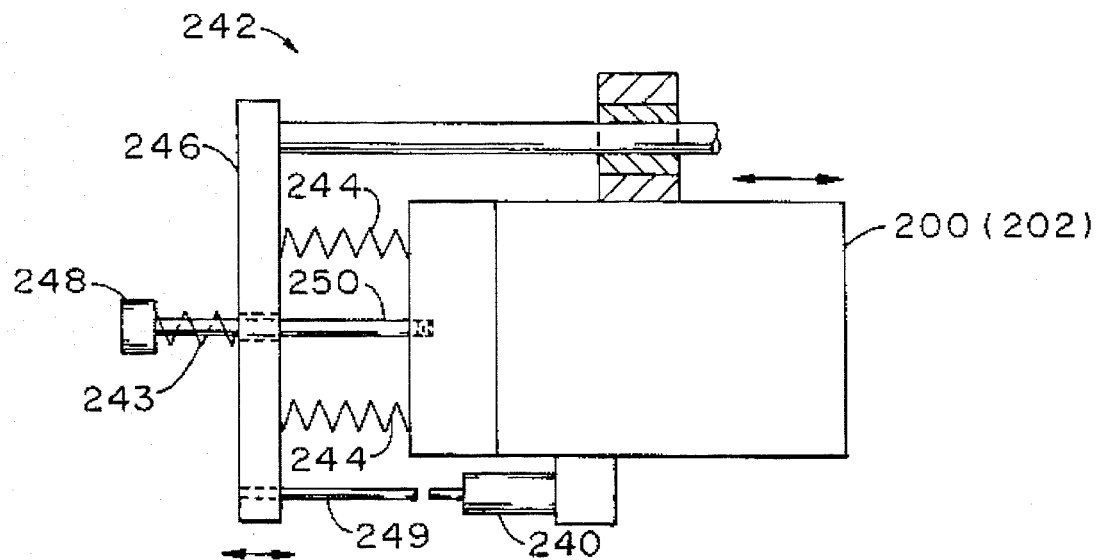
FIG. 19 is a diagrammatic representation of an arrangement for sensing mislocation of a connector block on a formboard.

The mechanism of FIG. 19 makes LVDT 240 highly sensitive to the touch of docking pins 235 on fixture 192. The mechanism shown provides a two-way, self-centering compliant axis for end-effector/LVDT movement, i.e., opposing springs 243 and 244 are translated between the end effector 200/202, a plate 246 and a boss 248 that retains spring 243 against the side of the plate opposite springs 244. An arm or extension 249 of plate 244 extends in the direction of the LVDT, and spring 243, mounted on a shaft 250, moves freely through plate 246 such that a small movement of the end effector causes LVDT engagement with arm 249 when docking pins 235 engage fixture 192. Fixture engagement is broken when the algorithm in 196 orders raising of the end effector for each search effort. The opposing springs immediately restore and maintain the LVDT and arm extension in the spaced position shown in FIG. 19.

When pins 235 find openings 237, insertion jaws 218 are positioned to insert terminal 49 into connector cavity 194 in the manner described above.

After the insertion of each terminal 49 is accomplished, the program of each controller 196 orders a pull test by end effectors 200 and 202 on each terminal. Jaws 218b continue to grip terminal 49 while robot arm 207 is moved upwardly a fixed distance about a horizontal axis 260 of the robot. If the terminal is secure in the connector block, LVDT 240 senses the force exerted on the terminal by the "pull" of the secure terminal, and signals 196 to translate shaft 216 (FIG. 13) to align the next circuit 48 for centering and insertion into the next connector block. If retention force is lacking, the LVDT senses this also and signals a television monitor 270 (FIG. 1) to instruct a workman that the terminal is not secure. The software controlling the end effector also notes the circuit and connector block of the loose terminal and informs the monitor so that the workman can view the monitor and then quickly locate the circuit and block, and then manually insert and pull test the terminal. This is accomplished after the formboard is manually conveyed from conveyor 188 to rework station 20 and conveyor 190, and after controllers 196 order the lowering of the formboard from darts 199 (FIG. 22) to the level of conveyor 190.

After each end effector 200 and 202 inserts a circuit terminal 49 into a connector cavity 194 and pull tests the insertion, the software of robot controller 196 orders the robots to the next set of connector blocks, the positions of which are (again) known by the software of the controllers. Shaft 216 (FIG. 13) is again rotated to translate carriage 206 and the next presentation jaw set 208 containing a circuit 48 to a position over insertion jaws 218 and centering jaws 220. Jaws 208 are now ordered open to release the circuit for centering by jaws 220, which are now returned to their position beneath jaws 208 and 218, and for insertion into the next connector cavity 194 by jaws 218. This process continues until all circuits held by the presentation jaws are released to and inserted into connector cavities by jaws 218. The controller software then orders return of the end effectors to carousel 32 to pick at least three more circuits 48 from the carousel. Controller 196 orders vertical translation of the carousel face 102 so that up to three circuit wires 48 are always available for removal by presentation jaws 208. Similarly, when one face of the carousel is emptied, the controller orders rotation of the carousel by indexing motors 143 (FIG. 10) to present a new carousel face of circuits to the end effectors.

When all circuit terminals are properly inserted in connector blocks 180, a workman connects a test instrument to the connector blocks and commences continuity testing of the inserted circuits and connector blocks. (The connector blocks are commonly connected to a single plug by wires (not shown) located on each formboard. The workman connects the test instrument to the plug for the testing process.) After testing, and if the testing shows continuity for all circuits 48, the formboard, now containing a harness comprised of the circuits and their connector blocks, is manually conveyed from work station 20 to work station 22 over conveyor 190. If there is a continuity problem, the workman disconnects the instrument and removes the harness from the formboard for further examination.

Manual operations are performed at work station 22 such as wrapping the harness with electrical tape.

The presentation jaws 208 of each end effector 200 and 202 can hold up to three circuits 48, as discussed above and in the embodiment shown in FIG. 13. The system can be programmed to insert less than three circuits and it can indicate their location on the carousel. In such a case, additional wedges 108 and cylinders 110 can be suitably located in each carousel to open the clips containing circuits so that a high degree of flexibility is provided in regard to the loading onto and the removing of circuits from the carousel.

After a carousel 32 is emptied of circuits 48 by the end effectors, wheel cylinders 150 are again inflated and a workman removes the carousel from frame 132 at the robot station. He then docks a new full carousel in the frame at the robot station. The above process of circuit removal and terminal insertion begins again.

While the invention has been described in terms of preferred embodiments, the claims appended hereto are intended to encompass all embodiments which fall within the spirit of the invention.

What is claimed is:

1. A method of making a wire harness, comprising:
   using a sequential wire processor to sequentially fabricate circuits having opposed ends, and for terminating at least one of the opposed ends of each circuit with respective terminals for insertion into respective connector cavities,
   sequentially transferring the circuits to respective circuit retaining clips located on a movable multi-sided carousel,
   moving the carousel containing the circuits to an inspection station,
   inspecting the carousel to determine the need for additional circuits to complete a harness, and to manually insert such missing circuits into empty clips on the carousel,
   moving the inspected carousel to a buffer area to await transfer to a robotic station or directly to said station if the robotic station is ready to receive a carousel,
   using end effectors of robots at the robotic station to remove circuits from the clips of the carousel and to transfer the circuits to a formboard on which are located connectors provided with cavities for receiving the terminal ends of said circuits, and
   using said end effectors to insert the terminal ends into said cavities.

2. The method of claim 1 including directing defective circuits to a location separate from the carousel.

3. The method of claim 2 including:
   using a personal computer and software to control the transfer of the circuits to the carousel from the wire processor and to direct defective circuits to the location separate from the carousel.

4. The method of claim 3 in which the personal computers and software are interfaced with indexing apparatus, and
   using said computer, software and indexing apparatus to effect sequential vertical movement of the sides of the carousel and rotation of the carousel in cooperation with the sequential wire processor and means for sequentially transferring circuits from the wire processor to the carousel.

5. The method of claim 1 in which the carousel is docked into indexing apparatus at the location of the sequential wire processor and the means for effecting the transfer of the circuits to the carousel.

6. The method of claim 1 in which the clips have jaws that receive and retain the circuits, the method including:
   opening the jaws of the clips to receive the circuits, and closing the jaws on each circuit after it is received.

7. The method of claim 6 in which the clip jaws grip crimped portions of terminated ends of the circuits.

8. The method of claim 1 in which twisted wire leads are added to empty clips with proper terminal orientation on the carousel at the inspection station.

9. The method of claim 1 including:
   docking the carousel in indexing means located at the inspection station, and
   using said indexing means, a personal computer and software at said inspection station to order carousel rotation and vertical movement of carousel sides.

10. The method of claim 1 including using a routine that orders the robots to search for a connector cavity a certain number of times if the robot end effectors miss the cavity in the process of attempting to insert a circuit end in the cavity.

11. The method of claim 1 including
   using the end effectors to pull-test each inserted circuit end to determine retention of circuit ends in the connector cavities.

12. The method of claim 11 including
   directing the formboard with connectors and circuits to an inspection/rework station,
   manually inserting circuit ends into connector cavities missed by the end effectors at said inspection/rework station, and
   manually inserting circuit ends in the cavities that failed the pull-test performed by the end effectors.

13. The method of claim 1 including the steps of removing the formboard with the circuits and connectors from the robotic station and supplying another formboard with empty connectors to the robotic station.

14. The method of claim 1 in which the end effectors operate under control of respective electrical controllers and a programmable computer, the method including
   changing the program of the computer and the connectors on the formboard to make different harnesses.

* * * * *